US010983493B2

(12) United States Patent
Frazer et al.

(10) Patent No.: US 10,983,493 B2
(45) Date of Patent: Apr. 20, 2021

(54) METHODS, APPARATUS, AND SYSTEMS FOR MONITORING AND/OR CONTROLLING DYNAMIC ENVIRONMENTS

(71) Applicant: Opteon Corporation, Cambridge, MA (US)

(72) Inventors: Mark J. Frazer, Toronto (CA); T. Eric Hopkins, Wellesley, MA (US); Timothy N. Schaeffer, Somerville, MA (US)

(73) Assignee: Opteon Corporation, Cambridge, MA (US)

( * ) Notice: Subject to any disclaimer, the term of this patent is extended or adjusted under 35 U.S.C. 154(b) by 61 days.

(21) Appl. No.: 16/454,257

(22) Filed: Jun. 27, 2019

(65) Prior Publication Data

US 2020/0150612 A1    May 14, 2020

Related U.S. Application Data

(63) Continuation of application No. 16/148,192, filed on Oct. 1, 2018, now abandoned, which is a continuation
(Continued)

(51) Int. Cl.
*G05B 19/042*     (2006.01)
*G05B 15/02*      (2006.01)
(Continued)

(52) U.S. Cl.
CPC ....... *G05B 19/0421* (2013.01); *G05B 13/021* (2013.01); *G05B 15/02* (2013.01);
(Continued)

(58) Field of Classification Search
CPC .. G05B 13/021; G05B 15/02; G05B 19/0421; G05B 19/0423; G05B 19/0426;
(Continued)

(56) References Cited

U.S. PATENT DOCUMENTS 4,380,698 A    4/1983 Butts
4,517,637 A    5/1985 Cassell
(Continued)

FOREIGN PATENT DOCUMENTS

CN        1353828 A    6/2002
CN      101131575 A    2/2008
(Continued)

OTHER PUBLICATIONS

Bolton, W., "Programmable Logic Controllers," (Elsevier, 4th ed., 2006) (pp. 1-292).
(Continued)

*Primary Examiner* — Crystal J Barnes-Bullock
(74) *Attorney, Agent, or Firm* — Smith Baluch LLP

(57) ABSTRACT

A dynamic environment (e.g., an automated industrial process) has multiple conditions in response to which corresponding actions are required, and comprises various equipment, control device(s) to control the equipment, and one or more sensors to generate input signal(s) representing a monitored condition of the environment. A control system for the environment comprises a master processor and one or more co-processors, wherein the master processor configures a given co-processor to evaluate only a first subset of conditions expected to occur in the environment within a specified time period (e.g., less than a response time of the master processor), and to provide first control information representing an action to be taken if a particular condition of the first subset is satisfied. The co-processor receives the input signal(s) representing the monitored condition, processes the input signal(s) so as to determine if the particular condition of the first subset is satisfied, and provides the first control information to the control devices so as to control the equipment. Exemplary applications include dynamic envi-
(Continued)

US 10,983,493 B2

Page 2 ronments in which machine vision techniques and/or equipment are employed.

30 Claims, 10 Drawing Sheets

Related U.S. Application Data of application No. 15/283,980, filed on Oct. 3, 2016, now Pat. No. 10,101,720, which is a continuation of application No. 13/646,326, filed on Oct. 5, 2012, now Pat. No. 9,459,607.

(60) Provisional application No. 61/543,680, filed on Oct. 5, 2011.

(51) Int. Cl.
  *G05B 19/05* (2006.01)
  *G06F 11/20* (2006.01)
  *G06F 11/07* (2006.01)
  *G05B 13/02* (2006.01)

(52) U.S. Cl.
  CPC ..... *G05B 19/0423* (2013.01); *G05B 19/0426* (2013.01); *G05B 19/0428* (2013.01); *G05B 19/052* (2013.01); *G05B 19/054* (2013.01); *G06F 11/07* (2013.01); *G06F 11/2005* (2013.01); *G05B 2219/1153* (2013.01); *G05B 2219/2214* (2013.01); *G05B 2219/2231* (2013.01)

(58) Field of Classification Search
  CPC .............. G05B 19/0428; G05B 19/052; G05B 19/054; G05B 2219/1153; G05B 2219/2214; G05B 2219/2231; G06F 11/07; G06F 11/2005
  See application file for complete search history.

(56) References Cited

U.S. PATENT DOCUMENTS

| | | | |
|---|---|---|---|
| 4,858,101 A | 8/1989 | Stewart et al. |
| 4,876,664 A | 10/1989 | Bittorf et al. |
| 5,222,017 A | 6/1993 | Yellowley et al. |
| 5,287,548 A | 2/1994 | Flood et al. |
| 5,594,917 A | 1/1997 | Palermo et al. |
| 5,600,845 A | 2/1997 | Gilson |
| 5,748,468 A | 5/1998 | Notenboom et al. |
| 5,978,352 A | 11/1999 | Imaizumi et al. |
| 6,282,462 B1 | 8/2001 | Eric |
| 6,536,029 B1 | 3/2003 | Boggs et al. |
| 6,567,709 B1 | 5/2003 | Malm et al. |
| 6,594,529 B1 | 7/2003 | Boggs et al. |
| 6,646,564 B1 | 11/2003 | Azieres et al. |
| 6,665,650 B1 | 12/2003 | O'grady et al. |
| 6,941,247 B2 | 9/2005 | Voigt et al. |
| 6,944,746 B2 | 9/2005 | So |
| 6,968,242 B1 | 11/2005 | Hwu et al. |
| 7,086,036 B2 | 8/2006 | Boggs et al. |
| 7,120,505 B2 | 10/2006 | Nakamura et al. |
| 7,167,971 B2 | 1/2007 | Asaad et al. |
| 7,200,741 B1 | 4/2007 | Mine |
| 7,260,668 B2 | 8/2007 | Franke et al. |
| 7,469,177 B2 | 12/2008 | Samad et al. |
| 7,472,106 B2 | 12/2008 | Muneta et al. |
| 7,522,066 B2 | 4/2009 | Galera et al. |
| 7,577,482 B1 | 8/2009 | Steele et al. |
| 7,593,784 B2 | 9/2009 | Carle et al. |
| 7,613,783 B2 | 11/2009 | Naismith |
| 7,774,074 B2 | 8/2010 | Davlin et al. |
| 7,987,305 B2 | 7/2011 | Blair et al. |
| 8,155,762 B2 | 4/2012 | Hirano |
| 8,195,844 B2 | 6/2012 | Fulton et al. |
| 8,321,057 B2 | 11/2012 | Maly |
| 8,761,036 B2 | 6/2014 | Fulton et al. |
| 8,904,074 B2 | 12/2014 | Lee et al. |
| 9,185,031 B2 | 11/2015 | Okita |
| 9,459,607 B2 | 10/2016 | Frazer et al. |
| 10,101,720 B2 | 10/2018 | Frazer et al. |
| 2005/0097233 A1 | 5/2005 | Oka et al. |
| 2007/0013547 A1 | 1/2007 | Boaz |
| 2007/0194944 A1 | 8/2007 | Galera et al. |
| 2007/0266370 A1 | 11/2007 | Myers et al. |
| 2008/0046103 A1 | 2/2008 | Ashida |
| 2008/0082186 A1 | 4/2008 | Hood et al. |
| 2008/0260297 A1 | 10/2008 | Chung et al. |
| 2009/0234471 A1 | 9/2009 | Chandhoke |
| 2010/0046532 A1 | 2/2010 | Okita |
| 2010/0281483 A1 | 11/2010 | Rakib et al. |
| 2011/0018706 A1 | 1/2011 | Egawa |
| 2011/0022192 A1 | 1/2011 | Plache et al. |
| 2011/0022822 A1 | 1/2011 | Chandhoke |
| 2011/0077749 A1 | 3/2011 | Shang et al. |
| 2011/0157389 A1 | 6/2011 | Mcclellan |
| 2011/0161538 A1 | 6/2011 | Decker |
| 2011/0230991 A1 | 9/2011 | Case |
| 2013/0090745 A1 | 4/2013 | Frazer et al. |
| 2013/0096697 A1 | 4/2013 | Frazer et al. |
| 2019/0041819 A1 | 2/2019 | Frazer et al. |

FOREIGN PATENT DOCUMENTS

| | | | |
|---|---|---|---|
| CN | 101498468 A | 8/2009 |
| CN | 201765486 U | 3/2011 |
| CN | 102183939 A | 9/2011 |
| CN | 102200786 A | 9/2011 |
| DE | 102009047024 A1 | 5/2011 |
| JP | S5330876 B | 3/1978 |
| JP | S5364181 A | 6/1978 |
| JP | 2002297209 A | 10/2002 |
| JP | 2010079355 A | 4/2010 |

OTHER PUBLICATIONS

Decision of Rejection dated Nov. 9, 2016 from Japanese Patent Application No. 2014-254803 with English Translation.
Dias, J. et al., "Simulating Pursuit with Machine Experiments with Robots and Artificial Vision," IEEE Transactions on Robotics and Automation, vol. 14, No. 1, Feb. 1998, pp. 1-18.
Extended European Search Report dated Jul. 27, 2015 from EP Application No. 12838771.9.
International Search Report and Written Opinion dated Dec. 11, 2012 from Application No. PCT/US12/59097.
Ito, T. et al., "A Master-Slave Adaptive Load-Distribution Processor Model on PCA," Proceedings of the 19th IEEE International Parallel and Distributed Processing Symposium, Apr. 2005, 8 pages.
Martinez, J. et al., "A modular and scalable architecture for PC-based real-time vision systems," Real Time Imaging, vol. 9, 2003, pp. 99-112.
Notice of Allowance dated Aug. 17, 2016 from U.S. Appl. No. 13/646,326.
Notice of Allowance dated Sep. 12, 2016 from U.S. Appl. No. 13/646,452.
Office Action dated Apr. 22, 2016 from U.S. Appl. No. 13/646,326.
Office Action dated Aug. 7, 2015 from U.S. Appl. No. 13/646,326.
Office Action dated Jun. 29, 2017 from Japanese Application No. JP 2017-045058 w/English language translation, 7 pages.
Office Action dated Mar. 11, 2016 from Japanese Patent Application No. 2014-534803.
Office Action dated Mar. 31, 2016 from CN Application No. 2012800597609.
Office Action Search Report from CN Application No. 2012800597609, dated Nov. 22, 2016.
Office Action Search Report from CN Application No. 2012800597609.
Rao, N.. "Programmable Controllers for Special Control Applications in Rolling Mills," Industrial Automation and Control, 1995, IEEE/IAS International Conference, Jan. 5, 1995, pp. 173-177.

(56) References Cited

OTHER PUBLICATIONS

Tang et al., "Application Technology of Programmable Controller," published by Hubei Science and Technology Press, 2008, 35 pp.
Third Office Action dated Jan. 4, 2018 from Chinese Application No. 201280059760.9.
Ziemba, R. "Use of programmable logic controller (PLC) for temperature, position, velocity and pressure control of injection molding machinery," Industry Applications Annual Meeting, 1988, Conference Record of the 1988 IEEE, pp. 12-19.
Chinese Office Action and English Translation Thereof in Chinese Patent Application No.: 201811233180.2 dated Jan. 15, 2021, 14 pages.

METHODS, APPARATUS, AND SYSTEMS FOR MONITORING AND/OR CONTROLLING DYNAMIC ENVIRONMENTS

CROSS-REFERENCE TO RELATED APPLICATIONS

The present application is a continuation of U.S. non-provisional application Ser. No. 16/148,192, filed Oct. 1, 2018, entitled "Methods, Apparatus, And Systems For Monitoring And/Or Controlling Dynamic Environments," which is a continuation of U.S. non-provisional application Ser. No. 15/283,980, filed Oct. 3, 2016, entitled "Methods, Apparatus, And Systems For Monitoring And/Or Controlling Dynamic Environments," which claims priority benefit under 35 U.S.C. § 120 to U.S. non-provisional application Ser. No. 13/646,326, filed on Oct. 5, 2012, entitled "Methods, Apparatus, And Systems For Monitoring And/Or Controlling Dynamic Environments," which in turn claims a priority benefit, under 35 U.S.C. § 119(e), to U.S. provisional application Ser. No. 61/543,680, filed on Oct. 5, 2011, entitled "Methods, Apparatus and Systems for Monitoring and/or Controlling Dynamic Environments." All of the aforementioned applications are hereby incorporated herein by reference in their entirety.

BACKGROUND

A programmable logic controller (PLC) is a special form of computer-based controller typically employed to control equipment, machinery and/or instrumentation in automated industrial electromechanical processes. A common example of such an automated industrial electromechanical process is given by the operation of a factory assembly line. In the dynamic environment of a factory assembly line, there may be multiple pieces of industrial equipment, machinery and/or instrumentation (collectively referred to as "equipment" for simplicity) associated with the fabrication, assembly, and/or packaging of parts/components, as well as the transport of the parts/components amongst various stages of fabrication, assembly and/or packaging.

FIG. 1 provides a general illustration of the typical role of a conventional PLC 50 in connection with an automated industrial process 10 such as the operation of a factory assembly line. In addition to multiple pieces of equipment 20, the dynamic environment of a factory assembly line typically includes several control devices 30 (e.g., actuators) for operating the multiple pieces of equipment 20, as well as multiple input devices 40 (e.g., sensors) to provide indications of equipment status and/or various conditions associated with fabrication, assembly, packaging and/or transport of parts/components. Such indications provided by the input devices 40 often are referred to as "states" or "conditions" of the dynamic environment. Some examples of control devices 30 used to operate the equipment 20 include magnetic relays, solenoids, electric motors, and pneumatic or hydraulic cylinders. Some examples of input devices 40 include limit switches, position sensors, analog sensors (e.g., pressure or temperature sensors), and imaging devices (e.g., cameras).

Generally speaking, the PLC 50 is employed to monitor input signals 66 provided by input devices 40. These input signals, respectively or in various combinations, represent different states (conditions) of the dynamic environment as a function of time. In response to the input signals present at a given time, the PLC 50 generates output signals 68 to the control devices 30 for operating the industrial equipment 20, to ensure the automated process 10 is implemented efficiently and predictably. To this end, the PLC 50 generally is employed to coordinate predetermined sequences of actions to be taken by the equipment 20 implementing the process 10, in which respective actions may need to occur within a certain time window contingent on information provided by the input devices 40 (via the input signals 66).

A typical PLC includes programmable memory to store processor-executable instructions and employs various other electronic components to implement functions such as logic, sequencing, timing, counting, and arithmetic. In terms of general architecture and various aspects of functionality, PLCs are in many respects similar to general-purpose computers (e.g., desktop or laptop personal computers); however, whereas general-purpose computers typically are optimized for calculation and display tasks, PLCs generally are optimized for control tasks in a dynamic environment such as an automated industrial process. Accordingly, PLCs generally are thought of as special-purpose control computers for controlled dynamic environments. Since PLCs often are employed in the demanding conditions of an automated industrial process, from a package design standpoint conventional PLCs often tend to be ruggedly designed so as to withstand demanding environments in which the PLC may be exposed to one or more of physical vibrations, challenging temperature and humidity conditions, dust or potentially damaging materials, and electrically noisy environments.

FIG. 2 illustrates a generalized block diagram of the typical electrical components/circuitry (e.g., "hardware") constituting the conventional PLC 50 of FIG. 1. As shown in FIG. 2, the basic functional components of the PLC 50 include a processor unit 52, memory 54, power supply 56, input interface 58, output interface 60, and one or more communications interfaces 62 all communicatively and/or electrically coupled to one another. FIG. 2 also shows a programming device 64 communicatively coupled to the PLC 50 and employed to program the PLC.

In FIG. 2, the processor unit 52 includes a microprocessor to interpret input signals 66 received by the input interface 58, and in turn provide output signals 68 via the output interface 60 so as to implement control actions according to a program (e.g., series of processor-executable instructions) stored in the memory 54. In particular, the memory 54 stores the program containing instructions representing the control actions to be implemented by the microprocessor, as well as various data relating to input signals, output signals and operation of the microprocessor as it carries out various instructions. The input interface 58 provides to the processor unit 52 information via input signals 66 received from external input devices (e.g., sensors, switches, meters, counters, etc.). The processor unit 52 in turn communicates control actions to external output devices (e.g., valves, motors, etc.) via the output signals 68.

In FIG. 2, examples of components constituting the respective input and output interfaces may include analog-to-digital converters, optocouplers/optoisolators, buffers, latches, and drivers so as to appropriately interface with various external input and output devices associated with the controlled dynamic environment. Although four input signals and four output signals are shown for purposes of illustration in FIG. 2, it should be appreciated that different types of conventionally available PLCs may be configured to accept different numbers of input signals (some number N of input signals) and provide different numbers of output signals (some number X of output signal), and that the number of input signals and output signals need not necessarily be the same. In general, the number N of input signals and the number X of output signals is dictated at least in part by the number of input devices 40 employed to monitor the automated process 10 of FIG. 1 and the number of control devices 30 employed to control the equipment 20.

In the PLC 50 shown in FIG. 2, the communications interface(s) 62 is/are used to receive and transmit various data (which may relate to one or more of the programs for execution by the processor unit 52, the input signals, the output signals, other data to be utilized by the processor unit 52 in executing the program, etc.) via one or more communication networks from or to one or more network-based external input/output devices and/or other remote PLCs. In general, the communications interface(s) 62 implement such functions as device verification, data acquisition, synchronization between user applications, and connection management. The power supply 56 converts AC voltage to a low DC voltage (e.g., 5 Volts) required for the various circuitry in the PLC to operate. Finally, the programming device 64 (which in some examples may be coupled to the PLC 50 via the communication interface(s) 62) is employed to enter into the memory 54 the program to be executed by the processing unit 52; typically, the program is developed/written in the programming device 64 and then transferred to the memory 54 of the PLC 50.

FIG. 3 provides additional details of the internal architecture of the PLC 50 shown in FIG. 2, particularly in connection with the processor unit, various elements of memory, input/output interfaces, and busses to facilitate information transfer. For example, FIG. 3 illustrates that the processor unit 52 (denoted as CPU in FIG. 2) is associated with a clock 52A, the frequency of which determines the operating speed of the PLC and provides the timing and synchronization for various elements in the PLC. Information within the PLC is carried amongst the processor unit, various memory elements, and to and from the input/output interfaces 58 and 60 via multiple busses; in particular, the PLC employs a data bus for transporting data to and from the PLC's constituent elements, an address bus to send the addresses of locations for accessing stored data, and a control bus for signals relating to internal control actions. The PLC architecture also may include an I/O system bus for communications between the input/output interfaces 58 and 60 (from which the input signals 66 are received from external input devices, and the output signals 68 are provided to external output devices, respectively) and an input/output unit 55 configured to transfer input/output information between the I/O system bus and the PLC's data bus.

In general, the processor unit 52 (CPU) of the architecture shown in FIG. 3 includes an arithmetic and logic unit (ALU) that is responsible for data manipulation and carrying out arithmetic operations (e.g., addition, subtraction, multiplication, division) and digital logic operations (e.g., AND, OR, NOT, and EXCLUSIVE-OR), internal memory registers used to store information involved in program execution, and an internal control unit to receive the output of the clock 52A and control the timing of operations. The various memory elements constituting memory 54 may include read-only-memory (ROM) 54A to provide permanent storage for the operating system and fixed data used by the processor unit, user program random-access memory 54B (User program RAM) employed for the program to be executed by the PLC, and data random-access memory 54C (Data RAM) used for data (information regarding the status of input and output signals, values of timers and counters and other internal devices, etc.). The program to be executed by the PLC may also be stored in non-volatile memory.

From the PLC architecture illustrated in FIG. 3, it may be appreciated that although conventional PLCs often are considered special-purpose computers rather than general-purpose computers, both PLCs and general-purpose computers share many aspects of a "Von Neumann" computer architecture. In a Von Neumann computer architecture, computer instructions (the "user program" stored in User program RAM 54A) as well as any data required for program execution (e.g., stored in Data RAM 54C) are accessed from various memory elements over a common bus architecture (i.e., via the address, data and control busses shown in FIG. 3). Although conventional PLCs attempt to tailor computer performance by being special-purpose computing devices implementing specific functionality corresponding to a particular automated industrial process, the architecture of conventional PLCs nonetheless places fundamental limits on their performance, as they execute instructions serially and hence effectively have no capacity for parallel execution.

Programming of a PLC primarily is concerned with specifying digital logic functions that process one or more input signals representing a sensed condition ("state") associated with the automated process being implemented by various equipment at a given time. The digital logic functions acting on the monitored condition of the automated process generate one or more control signals in response to the monitored condition. As noted above, these control signals are applied to control devices that in turn control the various equipment to take some action involved in further implementing the automated process. At a high level, a PLC program generally implements a sequence of one or more actions in response to monitored conditions as a function of time (e.g., if A or B occurs, actuate C; if A and B occurs, actuate D). The automated process evolves over time as actuators control equipment to drive the process to new conditions. Hence, as noted above, the automated process constitutes a dynamic environment in which an evolution of conditions is monitored by the PLC, and wherein the PLC makes decisions and updates control signals to actuators, based on respective monitored conditions, to drive the environment to new conditions.

Many conventional PLCs are programmed via a "ladder logic" programming language to codify the digital logic that is used to evaluate inputs signals representing monitored conditions. Common ladder logic programming languages typically employ graphical diagrams that resemble "rungs" of a ladder, wherein respective rungs represent circuit diagrams for electromechanical relays (which were used in older logical control systems) to facilitate intuitive programming by control system engineers. Ladder logic is best suited to implement control solutions in which primarily binary variables are involved (e.g., the monitored conditions in a dynamic environment each may be represented as TRUE, i.e., logic one, or FALSE, i.e., logic zero).

However, in a variety of automated process environments, outputs of sensors may be analog signals. Accordingly, in some instances, if the direct output of a given input device/sensor is not in the form of a binary signal, the output of the input device/sensor may be pre-conditioned in some respects to provide the input signals 66 in binary form. For example, an analog output of a temperature sensing device may be first applied to a comparator circuit having a temperature set point voltage as another input so as to provide, as one of the input signals 66, a binary indication of whether or not the monitored temperature is above or below the particular temperature set point. Alternatively, an analog value may be converted to a quantitative value encoded into a multi-bit digital word used by the system to perform mathematical operations and/or make decisions. Similarly, a multi-bit output of a counter serving as an input device may be compared to a pre-determined count to in turn provide, as one of the input signals 66, a binary indication of whether or not the counter output is above or below the pre-determined count (alternatively, an output of a counter having some number B of bits may be provided directly as a number B of input signals 66). Yet other types of input devices may generate highly transient signals; for such devices, a latch may be employed to facilitate the detection of a signal edge or transient so as to provide an input signal of suitable duration to the PLC indicating the occurrence of the edge/transient. In other examples, input devices may include various networked devices, for which one or more communication status signals (e.g., data packet transmitted/received) may serve as one of the input signals 66.

Ladder logic and other languages for programming conventional PLCs generally are considered to be rules-based programming languages. A typical PLC program may be constituted by a series of rules, wherein each rule is constituted by one or more binary input signals (e.g., A, B, C, D) representing a monitored condition of the automated process, and a corresponding control signal (e.g., X) that is generated in response to particular digital logic evaluating the input signals. Accordingly, in some aspects a rule in a PLC program may be viewed in a manner similar to an "IF/THEN" statement (e.g., If (A AND NOT B) AND (C OR D), THEN X). The PLC program includes all of the rules necessary to implement all of the actions that are required in response to different combinations of input signals representing all of the different possible conditions of the automated process that may be monitored via the set of available input signals.

With reference again to FIG. 2, the programming device 64 (which may be a handheld programming device, a desktop console, or a personal computer such as a laptop or tablet computer) is typically employed to create, store and download to the PLC executable programs including a set of rules. When the program is executed by the PLC, the rules are typically executed sequentially from first to last and then repeated, wherein each pass through the set of rules in sequence often is referred to as a "scan" or "control loop." Thus, consecutive repetitions of the scan or control loop represent a continuous cycle of the PLC reading input signals, examining input signal using the logic encoded in the program rules, and then changing control signals output by the PLC as appropriate.

More specifically, with respect to general operation, including various housekeeping activities and performing scans or control loops, conventional PLCs typically function in a cyclical manner. For example, when power is initially applied to a PLC, the PLC may perform a self-check or diagnostic routine to ensure that various hardware components are functioning properly. With reference again to FIGS. 2 and 3, if no fault or error conditions are detected, the PLC then controls the input interface 58 and memory 54 so as to read each of the input signals 66 sequentially and store each read instance of a given input signal in a dedicated memory location. The PLC then executes its program by sequentially testing each rule (i.e., fetching, decoding and executing the program instructions in sequence) and solving the logic encoded in the rule.

In particular, for each rule, the stored instances of certain input signals as specified in the rule are retrieved from memory, the rule is evaluated based on the retrieved input signals, and if the rule is satisfied (i.e., all of the pre-requisite conditions specified in the rule are met), a control signal corresponding to the satisfaction of the rule is generated. If such a control signal is generated, it is stored in a dedicated memory location. Evaluation of a given rule may involve multiple read operations from, and write operations to, different memory locations (e.g., registers) as the digital logic codified in the rule is solved. As noted above, respective rules are evaluated sequentially as the PLC executes the ladder logic program; accordingly, while the PLC is evaluating a particular rule, it is inattentive to the other rules codified in the program.

If the PLC generates any control signals in response to evaluation of the rules, it may provide these for output as a set of updated control signals 68. These control signals in turn are transmitted to one or more actuators or other equipment to be controlled in connection with the automated process. The PLC then returns to performing the self-check, reading each of the input signals and storing them to memory, executing the program rules to complete the control loop, updating the control signals for output (if any), and repeating this cycle iteratively.

The time period required by the PLC to complete the cycle described above commonly is referred to as a "cycle time" or "scan time." Typical cycle times of conventional PLCs are on the order of approximately 10 milliseconds to hundreds of milliseconds. The cycle time generally is determined by the particular CPU used in the processor unit, the size of the program to be scanned (e.g., the number of rules constituting the program, which in turn depends at least in part on the number of input signals to be read, the number of input signal combinations for which independent evaluations are required, and the number of control signals to be generated), and the system functions that are in use pursuant to execution of the program. Thus, the more complex the program, the longer the cycle time will be.

It should be appreciated that, in a conventional PLC, the vast majority of rules when evaluated in a given cycle are not satisfied (i.e., no control signal is generated pursuant to evaluation of the rule); if a rule is not satisfied, the program merely moves to the next rule for evaluation. In this manner, it is common in conventional PLCs for a substantial portion of a given cycle to be spent evaluating successive rules without generating any control signals.

Although relatively quick compared to general-purpose computers programmed to implement similar functionality, the cycle time of a PLC is not instantaneous. As a result, the PLC does not "watch" its input signals all of the time, but instead the PLC samples the states of the input signals periodically depending on the cycle time. Furthermore, the cycle time constitutes a minimum delay in updating control signals (if generated pursuant to a satisfied rule) that are output by the PLC in response to sampled input signals. In this manner, the cycle time also may be viewed as a minimum response time (a "reaction time") of the PLC to a particular monitored condition (i.e., represented by a particular value for one or more of the input signals), and is often referred to as a "latency" of the PLC. Thus, it should be appreciated that due to this latency, an input signal that lasts for a duration shorter than the cycle time may be missed by the program (in general, any input signal must be present for longer than the cycle time). In some instances, external circuitry may be employed to latch transient signals so that they will not be missed entirely by the PLC. Even if a particular input signal is not "missed" due to latching, however, a control signal that is to be generated in response to the input signal may be generated by the PLC too late to be effective for the correct operation of the equipment being controlled.

Because of the cyclical nature in which a conventional PLC executes a program, all possible combinations of input signals (representing all possible conditions of the automated process being controlled for which some action is required) must be contemplated in a single control loop of the program. Stated differently, as noted above, as long as a monitored condition represented by one or more input signals is in some manner involved in causing some action to occur (via one or more control signals) at some point during the duration of an automated process, there needs to be one or more rules in the program that evaluate the particular monitored condition. As noted above, the latency of a conventional PLC scales with program complexity;

hence, as the number of possible conditions of the process for which actions are required increases, the program becomes larger and the latency becomes greater. Furthermore, in many automated processes, some conditions occur more frequently than others, and in some instances conditions that may occur rarely may be associated with a rule representing complicated logic that needs to be evaluated (which requires more processing time). Accordingly, significant portions of the cycle time may be "used up" (and latency exacerbated) by executing one or more rules to evaluate one or more monitored conditions that occur rarely.

SUMMARY

The Inventors have recognized and appreciated that typical latencies associated with conventional programmable logic controllers (PLCs) may be excessively long for monitoring and/or controlling some types of dynamic environments (e.g., involving automated systems and/or processes). More generally, conventional PLCs as well as other more general-purpose computers often are not appropriately suited for applications involving monitoring and/or controlling dynamic environments in which significant speed and/or precision is/are required in connection with response or reaction time (e.g., taking some action, such as controlling equipment, machinery and/or instrumentation, in response to one or more monitored conditions).

In particular, processor-based control devices employing a general-purpose computer architecture (or related computer architectures with a small and finite set of general purpose processors), and executing programs sequentially or cyclically, are not sufficiently fast to implement control functions in dynamic environments that require reflex-like reactions in response to evolving conditions of the environment, which may benefit from essentially simultaneous evaluation of multiple possible conditions and taking immediate action based on same. Examples of dynamic environments requiring reflex-like reactions include, but are not limited to, aircraft control, complex chemical process control, and machine vision applications (e.g., analysis of images to extract data for controlling various processes, such as automatic inspection and robot guidance).

In view of the foregoing, various inventive embodiments described herein are directed to methods, apparatus and systems for monitoring and/or controlling dynamic environments, in which reactions to evolving conditions of the environment may be provided with significantly lower latency and/or lower variability latency than possible with conventional PLCs and/or other conventional computing devices.

For purposes of the present disclosure, a "dynamic environment" refers to a process and/or system, whether implemented physically and/or virtually (e.g., for purposes of simulation), in which a condition of the process and/or system (also referred to herein as a "state" of the environment) may be monitored as a function of time, and one or more actions may be taken (e.g., in the form of control stimuli applied to the process and/or system) in response to a particular condition or evolution of conditions. In exemplary implementations discussed in greater detail below, actions taken in response to a particular condition or evolution of conditions of the dynamic environment may be "reflexive" in nature, in that they are nearly instantaneous as a result of the appreciably low latency achieved by the inventive methods, apparatus and systems disclosed herein. While many practical applications of the concepts disclosed herein are contemplated for physical implementations of automated industrial control processes and systems, for example, it should be appreciated that the inventive concepts disclosed herein are not limited in this respect, and may be applied advantageously in a variety of physical and/or virtual dynamic environments.

In connection with achieving appreciably low latency for controlling a dynamic environment, the Inventors have recognized and appreciated that for a given dynamic environment, different conditions requiring action may occur on different time scales and/or within different time frames (e.g., some conditions may occur more often than others, and/or in close temporal proximity with certain other conditions). Furthermore, some conditions may occur more often in particular sequences, and/or as a result of one or more particular actions previously having been taken. Accordingly, in one aspect of some inventive embodiments described herein, rather than considering the entire dynamic environment as a whole and contemplating all possible conditions of the dynamic environment over all time for which actions may be required, the Inventors have recognized and appreciated that by breaking up the dynamic environment into multiple sub-environments (e.g., sub-processes and/or sub-systems) based on a variety of criteria (e.g., time scale/time frame, particular patterns of evolution or change in condition), a control methodology may be implemented with significantly low latency. Stated differently, the Inventors have recognized that by identifying particular categories of conditions that can occur and corresponding required actions that may be taken in a dynamic environment (e.g., a subset of conditions that could all occur within a certain time period, a subset of conditions that could only occur after a particular action was taken, etc.), the control solution may be subdivided and shared amongst multiple assessment and control resources to significantly reduce latency.

With the foregoing in mind, some embodiments of the present invention relate to a control system for a dynamic environment (e.g., as a replacement for the conventional PLC 50 shown in FIG. 1), wherein the control system employs a "master" processor (also referred to herein as a "housekeeping" processor) and one or more independent (i.e., asynchronous) "slave" co-processors (also referred to herein as "responsive" co-processors) each dedicated to evaluating one or more conditions constituting a subset of all possible conditions that need to be evaluated in a given dynamic environment. The subset of conditions for which a given co-processor in the control system is tasked to evaluate may be based on a number of different criteria, as noted above (e.g., time scale/time frame, particular patterns of evolution or change in condition). For purposes of the present disclosure, "evaluating" a condition refers to determining the presence of the condition ("satisfying" the condition, e.g., by comparing some number N of monitored input signals at a given time to particular input signal values representing the condition) and taking appropriate action in response to the condition (e.g., generating one or more corresponding control signals, or particular instructions for generating same).

Such a control system including a master "housekeeping" processor and one or more slave "responsive" co-processors respectively dedicated to evaluating some subset of conditions in a dynamic environment may be viewed as adopting a "divide and conquer" approach to monitoring and controlling the dynamic environment. In particular, rather than employing a single processor to evaluate all possible conditions of the environment for which actions are required, the master processor may task one or more co-processors to evaluate only some subset of possible conditions for which actions are required, thereby relieving the master processor of significant processing burden. In this manner, the latency of the entire control system is a function of co-processor latency (e.g., if multiple co-processors are employed, the latency of the control system as a whole may be a function of the largest co-processor latency).

By distributing the condition evaluation process for the dynamic environment amongst multiple co-processors in the foregoing fashion, the latency of the control system as a whole may be significantly reduced (e.g., in some cases by several orders of magnitude) as compared to conventional control approaches employing a single PLC and/or general-purpose computer. In various implementations discussed in greater detail below, not only is appreciably low control system latency realized by such a "divide and conquer" approach, but predictable and repeatable latencies also may be realized with exemplary control system and/or co-processor architectures. One or both of low latency and low variability latency may be particularly advantageous in some machine vision applications, in which reliable/predictable machine behavior, including acquisitions of images correctly synchronized with machine and lighting system operation, is important. Low latency and low variability latency also may be important for coordinating control activities as indicated above with decisions resulting from computer analysis that may take place in a different time domain.

In one embodiment of a control system according to the present invention, a master processor (e.g., which in some cases may be implemented as a general-purpose computer) is communicatively coupled to one or more slave co-processors. Each slave co-processor includes its own dedicated memory (i.e., not shared with other co-processors, if they are present, and accessible only to the co-processor itself and the master processor), as well as associated hardware (e.g., processing and/or logic circuitry) to act on the contents of the dedicated memory. The contents of a given co-processor's dedicated memory may be provided (i.e., loaded into the co-processor) by the master processor. In exemplary system architectures discussed in greater detail below, in some aspects a given slave co-processor also has substantially unfettered access to input signals representing different conditions of a dynamic environment, as well as communication paths (e.g., with the master processor and the dynamic environment), such that multiple co-processors are capable of monitoring the same set of input signals at the same time and evaluating their associated conditions based on the same set of input signals.

In one exemplary implementation, the contents of the co-processor's dedicated memory includes information (e.g., a program) relating to evaluation of a single condition of the dynamic environment; hence, in such an implementation, a given co-processor is configured (e.g., to execute the program stored in the dedicated memory, or otherwise implement particular digital logic functions on the memory contents) to evaluate only the single condition of the dynamic environment pursuant to the particular information stored in the co-processor's dedicated memory (in other embodiments discussed below, a co-processor may be configured to evaluate multiple conditions). When a slave co-processor determines that its condition is present, it takes the corresponding prescribed action according to the co-processor's program/logic (e.g., the co-processor provides some output that in turn generates one or more control signals as appropriate) and notifies the master processor that its condition is satisfied. In other implementations, rather than the co-processor itself taking the corresponding prescribed action, the co-processor may merely notify the master processor that its condition is satisfied (e.g., by generating an interrupt to the master processor), and the master processor in turn may be appropriately configured to take the corresponding prescribed action. In either situation, by "offloading" from the master processor at least the evaluation of the condition, the co-processor significantly improves the response time of the control system as a whole.

In some embodiments discussed in further detail below, in response to a notification from a co-processor that its condition is satisfied, the master processor may "re-task" the co-processor by loading into the co-processor's dedicated memory new information relating to a new condition to evaluate (and corresponding action to be taken if the new condition is satisfied). In this manner, the master processor facilitates effective control of the dynamic environment as it evolves over time by dynamically re-tasking one or more co-processors of the control system (to evaluate new conditions and/or take new/different actions).

In some implementations of a control system according to the present invention, multiple slave co-processors may be employed if there are multiple conditions to be evaluated in the dynamic environment within a given time frame, such that respective co-processors are configured to evaluate different possible conditions and take appropriate action as necessary. In one aspect of such an implementation, the set of N available input signals representing different possible conditions of the dynamic environment may be provided identically (e.g., in parallel, via a bus architecture) and available simultaneously to all of the co-processors for evaluation. Accordingly, the respective co-processors independently (i.e., asynchronously) may monitor the set of N available input signals, evaluate their respective conditions, take action if/as appropriate, and notify the master processor when their conditions are satisfied. In this manner, as noted above, the latency of the control system is a function of a given co-processor's latency. In situations in which a co-processor is configured to evaluate a single condition, not only is the latency of the co-processor appreciably low, but the latency variation is appreciably low as well (and, for many practical purposes, substantially zero).

A variety of co-processor implementations are contemplated according to various embodiments of the invention. For example, in one embodiment, a co-processor may be implemented as a full-featured processor running an appreciably short program loaded in its dedicated memory (e.g., a single IF THEN statement inside a loop for evaluating a particular condition). In this type of co-processor implementation, typical latencies for the co-processor (based on conventional processors evaluating a relatively small number of instructions representing the IF THEN loop) may be on the order of about one microsecond. For applications in which space and/or hardware costs may be important practical considerations, however, the implementation of a co-processor as a full-featured processor, particularly if control of a dynamic environment entails evaluation of numerous conditions and implicates multiple co-processors in a control system, may be impractical in some instances (e.g., the processing resources being spent on evaluating a single condition may be greater than necessary, and may take up excessive chip space).

In view of the foregoing, in other co-processor implementations according to various embodiments of the invention, a significantly streamlined special-purpose co-processor includes pared-down digital logic to specifically implement a comparator function (e.g., the functional equivalent of an IF THEN statement) based on the contents of the co-processor's dedicated memory and the monitored input signals; in essence, the functional capability of the co-processor is reduced to the particular evaluation of a single condition via a significant reduction in hardware. Such a co-processor implementation accomplishes the goal of a low-cost, space-saving, low-latency solution. In exemplary implementations, several such co-processors may be implemented inexpensively in a field programmable gate array (FPGA), an application specific integrated circuit (ASIC), or a fully-customized circuit, for example.

In one aspect of a streamlined co-processor implementation as discussed above, to alternatively or further facilitate low latency, a particular memory structure is employed for the co-processor's dedicated memory to store information in the form of a "condition/action pair." In one example of such a memory structure, a condition/action pair comprises particular data stored in a memory location (e.g., a single memory register, or multiple adjacent memory registers) arranged as a first number of bits representing the condition to be evaluated, and a second number of bits representing an action to be taken if the condition is satisfied. Such a memory structure facilitates a straightforward and relatively simple digital logic implementation to compare monitored input signals to the first number of bits representing the condition to be evaluated and, if there is a match (i.e., the condition is satisfied), provide the second number of bits representing the corresponding action to be taken as a gated output of the co-processor. Accordingly, based on structured memory contents constituting a "condition/action pair" and relatively simple digital logic implementing a comparator and a gate to provide a gated output, and effective low-latency, low-footprint, and low-cost co-processor may be realized.

The configuration of a control system in which each co-processor is tasked with evaluating only a single condition (i.e., the smallest subset) of all possible conditions for the dynamic environment may be viewed as a "degenerate" case of minimum latency for the control system. More generally, the latency for the control system is dictated by the physical implementation of a given co-processor in the control system (e.g., full-featured microprocessor vs. pared-down simplified digital logic implementation), and/or the functions (e.g., programmed logic functions) being implemented by the co-processor. As discussed below, in some embodiments the physical implementation and/or the functions implemented by a co-processor are particularly designed such that an upper bound on a latency of the co-processor is below a required response time for the condition(s) being evaluated by the co-processor. In some cases, meeting such a requirement may require that the co-processor only be configured to evaluate a single condition, while in other cases the co-processor may be configured to evaluate a subset of some predetermined number of conditions (e.g., sequentially rather than "simultaneously," but on a purposefully limited number of conditions). In general, by purposefully limiting the function of the co-processor (e.g., size of the program executed by the co-processor and/or the information to be processed), an upper bound on latency may be essentially guaranteed.

Based on the foregoing premise of purposefully limiting the function(s) of a given co-processor, some implementations of a control system according to various embodiments of the present invention may be predicated at least in part on appropriately balancing the following design constraints in the context of controlling a particular dynamic environment: 1) ensuring that the co-processor is configured to evaluate a sufficiently comprehensive subset of conditions that may be present in the dynamic environment pursuant to some criteria (e.g., within a particular time frame, in a particular sequence, following previous particular actions being taken, etc.); 2) ensuring that the co-processor has sufficiently low (but not necessarily minimum achievable) latency to take action in response to satisfied conditions in an appropriate time frame (i.e., ensuring that there is a predictable and sufficiently low upper bound on the co-processor's latency); and 3) ensuring that realization of the co-processor entails reasonably low hardware costs and/or space requirements.

In view of the foregoing, some embodiments of the present invention are directed to a control system that includes an "action engine" that may comprise one or more co-processors, wherein a given co-processor of the action engine may be configured to evaluate a particular subset of multiple conditions that may arise in a dynamic environment. In one implementation of an action engine including multiple co-processors, each co-processor may function autonomously and simultaneously evaluate at any given time one or more particular conditions represented by some number N of input signals being monitored at the same time by all co-processors of the action engine.

In another implementation of an action engine according to one embodiment, the action engine is configured to evaluate up to some fixed maximum number of conditions so as to establish an upper bound on latency and ensure sufficiently low variation in latency. To this end, in one example an action engine comprises an "event table" realized by a memory structure that includes some number of multiple sequentially-indexed memory locations (e.g., registers, or contiguous groups of registers) each having a particular size. In one aspect, each such memory location is configured to store information in the form of a "condition/action" pair as discussed above, e.g., some first number of bits representing a condition to be evaluated, and some second number of bits representing some action to be taken if the condition is satisfied. In another aspect, respective memory locations of the event table store different condition/action pairs such that a given memory location in the event table is "dedicated" to evaluating a particular condition that may be represented by the N input signals.

In the foregoing example, the action engine further may include a "scanner," communicatively coupled to the event table and configured to receive the N input signals, to sequentially evaluate the conditions represented by the condition/action pairs stored in the respective memory locations of the event table. To this end, the scanner includes appropriate digital logic circuitry (e.g., logic gates to implement a comparator and a gated output) to read the contents of a given memory location and compare the condition portion of the condition/action pair to the respective values of the N input signals. In one example, the condition portion of the condition/action pair includes N bits of the overall information stored in the given memory location, such that there is a one-to-one correspondence between the condition portion of the condition/action pair and the N input signals. Regardless of whether or not the particular condition is satisfied (i.e., the respective values of the N input signals do or do not match the condition portion of the condition/action pair), the scanner proceeds to reading the contents of the next memory location in the event table so as to compare the condition portion of the condition/action pair stored in the next memory location to the respective values of the N input signals.

If a particular condition represented by the condition portion of a condition/action pair stored in a given memory location of the event table is satisfied (i.e., the respective values of the N input signals match the condition portion of the condition/action pair), the scanner provides as an output the action portion of the condition/action pair (e.g., as a gated output enabled by a comparator upon a match). This output itself may constitute one or more control signals, or represent an instruction that in turn generates one or more control signals, for controlling equipment in the dynamic environment. The scanner then proceeds to reading the contents of the next memory location in the event table so as to compare the condition portion of the condition/action pair stored in the next memory location to the respective values of the N input signals and, if there is a match, the scanner provides the action portion of the condition/action pair as a gated output. Once the scanner reaches the last memory location of the event table and appropriately processes the condition/action pair stored in this last memory location, the scanner returns to the first memory location in the event table and repeats the cycle of sequentially processing the contents of successive memory locations of the event table.

In some embodiments, an action engine including an event table and scanner as described above may be communicatively coupled to a master (or "housekeeping") processor that provides the contents of the event table (e.g., the condition/action pairs, and possibly other information) and oversees the appropriate mapping of particular condition/action pairs to particular memory locations of the event table (e.g., based on a particular order or sequence in which the master processor wants the action engine to process the condition/action pairs). In one aspect, the master processor may occasionally or periodically "re-task" the action engine by loading one or more new condition/action pairs into its event table for processing by the scanner of the action engine. To this end, the scanner may provide an indication to the master processor that the condition corresponding to a particular condition/action pair being processed is satisfied, in response to which indication the master processor may load one or more new condition/action pairs into the event table. Such an indication of a satisfied condition may be constituted by the generation of the output itself representing an action to be taken (which output may be monitored by the master processor), or in the form of a separate status signal or interrupt generated by the action engine and monitored by the master processor. Additionally (or alternatively), the scanner may provide an indication to the master processor that a full scan of the event table is complete (e.g., after processing of the condition/action pair stored in the last memory location of the event table), at which point the master processor may reload the event table with one or more new condition/action pairs, or a complete new set of condition/action pairs, for processing during a subsequent scan of the event table by the scanner.

In embodiments of a control system according to the present invention that include a master processor and an action engine as described above, in one aspect the housekeeping and "re-tasking" functions accomplished by the master processor facilitate a "divide and conquer" approach to controlling a dynamic environment, as discussed earlier. In particular, in some implementations, given some total number T of possible conditions for which corresponding actions may be required in a dynamic environment, the master processor is configured (e.g., programmed) to select only a particular subset of the total number T of possible conditions, and task the action engine at a given time to evaluate only this particular subset of conditions. As noted above, the master processor may be programmed to make the selection of a particular subset of conditions for evaluation by the processor based on various criteria. In one example, the master processor selects a subset of conditions for evaluation by the action engine based at least in part on a time period in which the subset of conditions is expected to occur in the dynamic environment, and in consideration of the response time (e.g., longest or "worst-case" response time) of the master processor itself in attending to its various duties (e.g., monitoring and/or controlling functions for which the master processor itself may be tasked in the overall context of the dynamic environment).

For example, in carrying out its own duties in the context of a given dynamic environment, the master processor itself has a limit on its ability to receive, process, and respond to information within a certain time period. In particular, a general purpose computer serving as the master processor is subject to various scheduling constraints (e.g., pursuant to scheduling and dispatching software) that governs the manner in which multiple processes that need to be attended to by the processor are assigned to execute. Given the serial nature in which processes need to be scheduled, there is necessarily some lag time, or "response time" of the master processor, representing an amount of time between a request to initiate a given process and providing some response pursuant to execution of that process. The response time of the master processor typically is based at least in part on the number of such processes that need to be scheduled in order for the master processor to attend to its required functions in the context of the dynamic environment, as well as the complexity of the respective processes being scheduled. In some respects, this situation is similar to that of a conventional PLC, in which the scan time or cycle time of the PLC is based on the number and complexity of rules encoded in the PLCs program, which places fundamental limits on the ability of the PLC to provide control signals within a particular time frame in response to monitored conditions.

The response time of the master processor may have some nominal expected or typical value, based at least in part on the number of respective processes that need to be scheduled and the complexity of those processes (which in turn is dictated at least in part by the requirements of the dynamic environment being monitored and controlled, and the complexity of control tasks at hand). Given the variability of functions potentially performed by the master processor in a given dynamic environment, however, there is typically a longest potential response time, or a "worst-case" response time, to which the master processor may be subject in processing information. If there are conditions of the dynamic environment (for which actions may be required) that may occur within a time period that is shorter than the worst-case response time of the master processor, the master processor itself effectively would be incapable of reliably responding to these conditions. Accordingly, the longest potential response time or "worst-case" response time of the master processor in the context of a given dynamic environment may serve as one example of a criterion upon which the master processor may select a subset of conditions for evaluation by the action engine. In this manner, the master processor essentially charges the action engine with "paying attention" to monitoring certain conditions of the dynamic environment during a time period in which the master processor effectively is incapable of doing so itself.

Stated differently, based on at least the criterion of time scale/time frame in which certain conditions may be expected in the dynamic environment, the master processor selects a subset of conditions that could arise in the dynamic environment during a time period corresponding to a worst-case response time of the master processor, and loads condition/action pairs into the action engine for processing during that time period. During that time period, the action engine may complete many hundreds or even thousands of scanning cycles before identifying that a particular condition represented in the action engine's event table is satisfied. Once the conditions are evaluated, appropriate action taken if/as necessary, and the master processor is again able to correspond with the action engine (i.e., within the worst-case response time of the master processor), the master processor may load one or more new condition/action pairs into the action engine's event table, for evaluation during the next time period during which the master processor may be preoccupied with other tasks (other scheduled processes). In one aspect, the newly loaded condition/action pairs may be based at least in part on the previously evaluated conditions and actions taken, if any. In this manner, the master processor is responsive to an evolution of conditions in the dynamic environment, and offloads significant processing burden to the action engine by repeatedly re-tasking the action engine to evaluate, at any given time, only a subset of conditions that are expected to occur within a particular time period (e.g., corresponding to the response time of the master processor).

In the foregoing example of an action engine, it should be appreciated that in one aspect, the combination of a dedicated memory location of the event table storing a particular condition/action pair, when coupled to the digital logic circuitry of the scanner to evaluate the condition (and, if satisfied, provide an output representing the action to be taken), is functionally equivalent to a co-processor as discussed above dedicated to evaluating a single condition. However, rather than only evaluating a single condition, the configuration of the scanner allows the digital logic circuitry performing the evaluation to be "shared" (e.g., in a scanned or time division multiplexed manner) amongst the respective memory locations of the event table, such that the combination of the scanner and the event table of the action engine essentially constitutes a co-processor configured to evaluate multiple conditions and take action as appropriate. Such a component arrangement facilitates efficient and conservative use of hardware resources.

In various aspects, the size (e.g., number of bits) of the respective memory locations in an event table of the action engine, the total number of dedicated memory locations in the event table, and the configuration of the scanner itself (e.g., the digital logic implemented by the scanner) are specified so as to achieve a desired latency for control of a particular dynamic environment, wherein the latency has a sufficiently low upper bound and/or sufficiently predictable (and in some cases insubstantial) variation. In one particular implementation discussed in greater detail below, an appropriately configured action engine based on an event table and a scanner achieves a latency for the action engine on the order of 10 nanoseconds per condition/action pair (e.g., based on a 100 MHz clock driving the logic functionality of the scanner); accordingly, for an event table having 128 memory locations respectively storing 128 condition/action pairs, for example, an action engine latency on the order of approximately 1.28 microseconds (128×10 nanoseconds) may be realized. Such a latency metric is several orders of magnitude lower than the typical latency of tens to hundreds of milliseconds observed in conventional PLCs.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive systems, methods and apparatus for monitoring and/or controlling dynamic environments. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
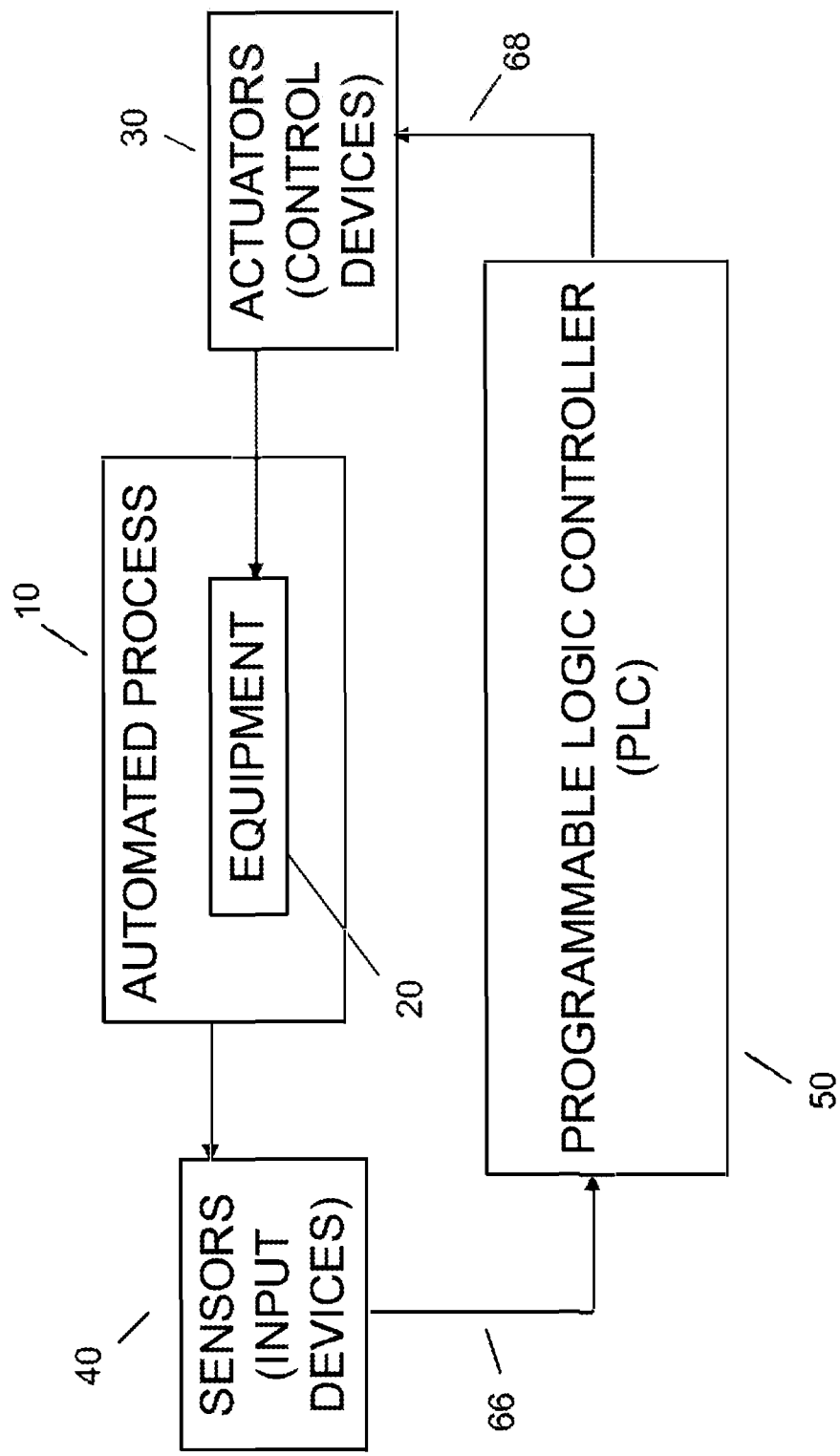
FIG. 1 is a general illustration of the typical role of a conventional programmable logic controller (PLC) in connection with an automated industrial process.
Figure 2:
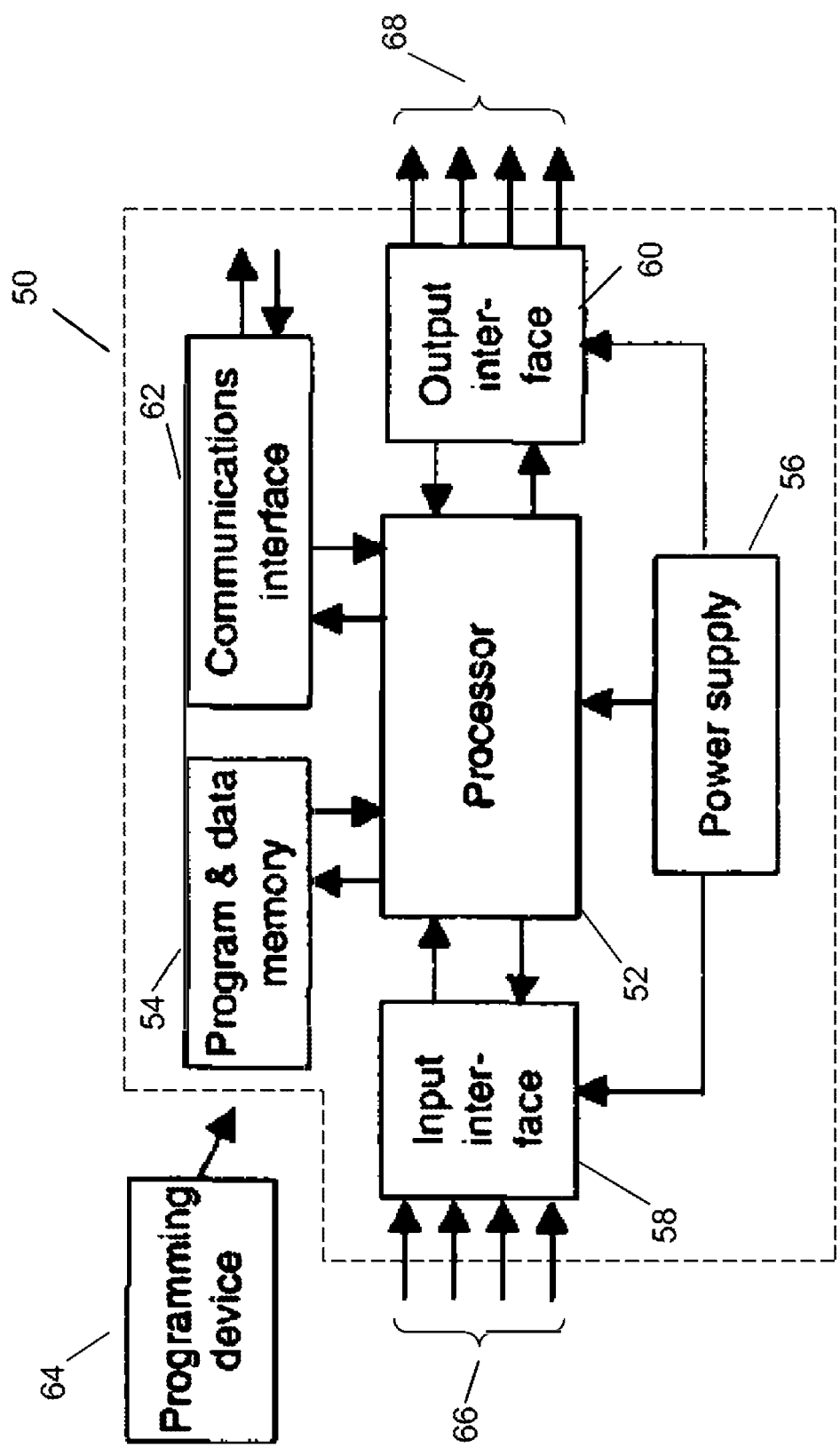
FIG. 2 is a generalized block diagram of the typical electrical components/circuitry (e.g., "hardware") constituting the conventional PLC of FIG. 1.
Figure 3:
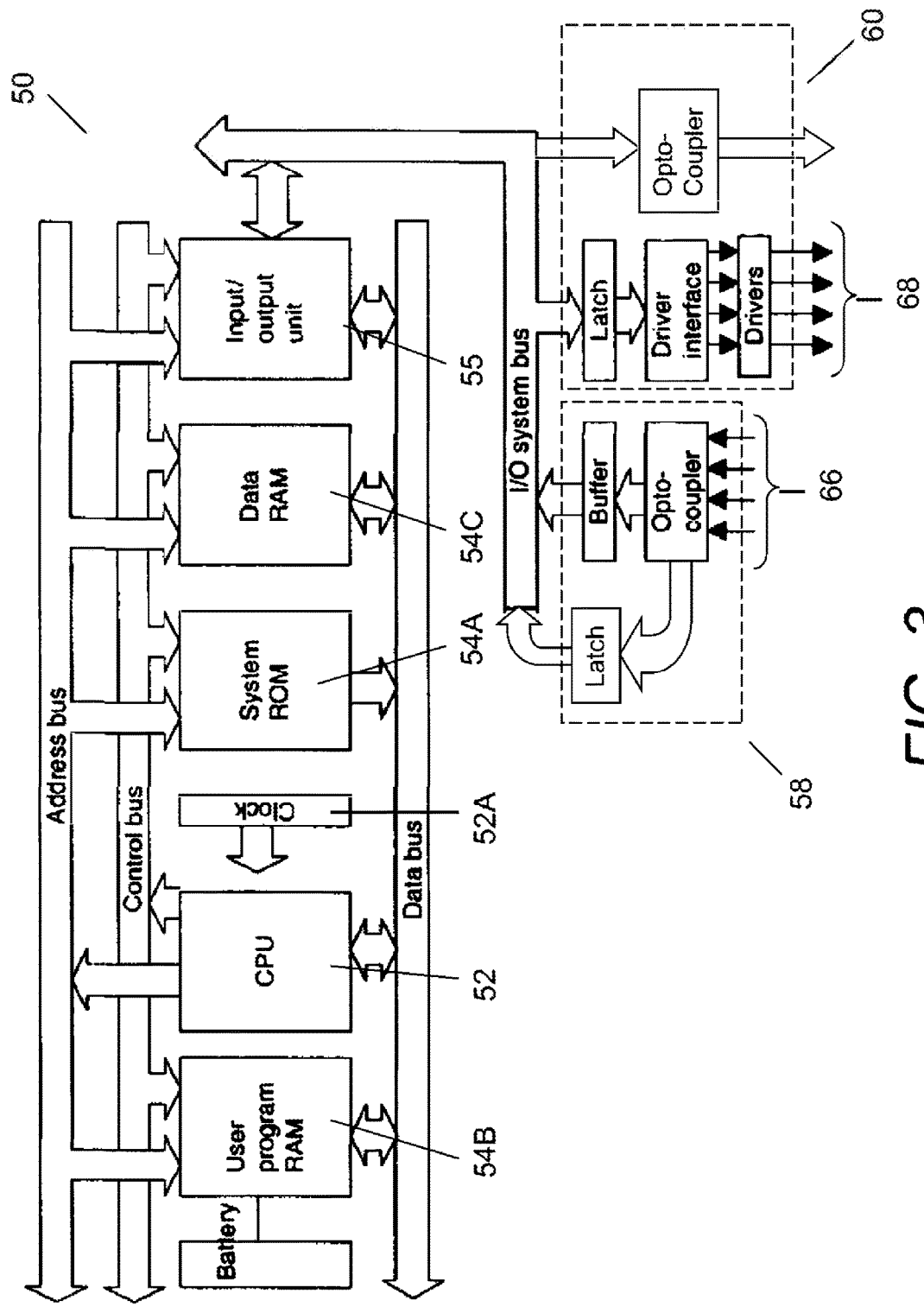
FIG. 3 is a block diagram that shows additional details of the internal architecture of the conventional PLC shown in FIG. 2, particularly in connection with the processor unit, memory, and input/output interfaces.
Figure 4:
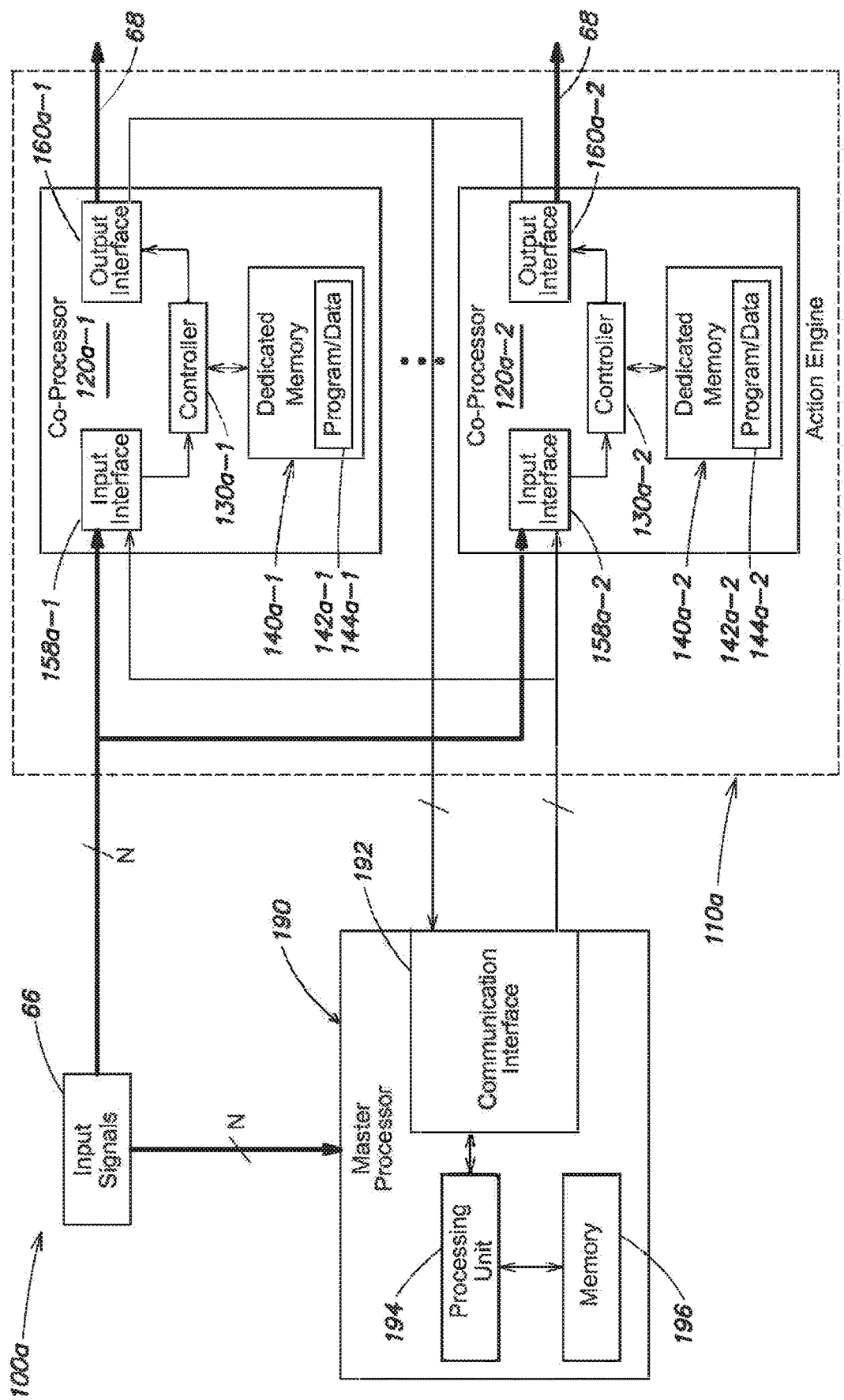
FIG. 4 is a block diagram illustrating a control system for monitoring and controlling a dynamic environment, wherein the control system includes a master processor communicatively coupled to an action engine comprising one or more co-processors, according to one embodiment of the present invention.

FIG. 4 is a block diagram illustrating a control system 100*a* for monitoring and controlling a dynamic environment, according to one embodiment of the present invention. With reference again to FIG. 1, in which a conventional programmable logic controller (PLC) 50 is shown as monitoring and controlling an automated process 10, in exemplary implementations discussed in greater detail below the control system of FIG. 4 is configured as a replacement for the PLC 50 shown in FIG. 1. However, it should be appreciated that the control system of FIG. 4 is not limited in this respect, and various control systems according to embodiments of the present invention, as well as constituent elements thereof, may have wide applicability for monitoring and/or controlling a variety of dynamic environments, particularly those requiring low latency (i.e., significantly fast response time) and/or low variability latency. One exemplary application of control systems according to the present invention is given by a dynamic environment in which machine vision techniques and/or equipment are employed, as discussed in greater detail below in connection with FIG. 10.

As illustrated in FIG. 4, the control system 100*a* of this embodiment includes a master processor 190 (also referred to as a "housekeeping CPU") that is communicatively coupled to an action engine 110*a*. The action engine 110*a* may comprise one or more responsive co-processors (respectively indicated in FIG. 4 as co-processors 120*a*-1 and 120*a*-2; collectively indicated as co-processors 120*a*). Each co-processor 120*a* includes an input interface 158*a* and an output interface 160*a* that are coupled to co-processor logic (indicated respectively as controllers 130*a*-1 and 130*a*-2; collectively controllers 130*a*). Exemplary input interfaces 158*a* output interfaces 160*a* may include, but are not limited to RS232 interfaces, Ethernet interfaces, universal serial bus (USB), and/or any other suitable parallel or serial communications interfaces. Each co-processor controller 130*a* is communicatively coupled to a dedicated memory (indicated respectively as memory 140*a*-1 and 140*a*-2; collectively memory 140*a*) that stores one or more conditions (indicated respectively as conditions 142*a*-1 and 142*a*-2; collectively conditions 142*a*) and at least one predetermined action (indicated respectively as action 144*a*-1 and 144*a*-2; collectively actions 144*a*) corresponding to the condition 142*a* stored in the same memory 140*a*. Although the action engine 110*a* shown in FIG. 4 includes only two co-processors 120*a*, it should be appreciated that action engines according to other embodiments are not limited in this respect, and may include only one co-processor or more than two co-processors.

In one aspect of the control system 100*a* shown in FIG. 4, the control system 100*a* monitors, controls, and/or synchronizes a dynamic environment by using the action engine 110*a* to evaluate conditions that occur on relatively fast time scales and by using the housekeeping CPU 190 to evaluate conditions that occur on relatively slower time scales. More generally, as discussed above, in some embodiments the housekeeping CPU 190 essentially tasks the action engine with "paying attention" to monitoring certain conditions of the dynamic environment during a time period in which the housekeeping CPU 190 effectively is incapable of doing so itself. In one aspect, the time period during which the action engine 110*a* is particularly tasked with monitoring certain conditions (and taking action in response to same if necessary) is based at least in part on a "response time" (also referred to as "latency") of the housekeeping CPU 190 (which response time results from limits placed on the housekeeping CPU's ability to process information given the number of different tasks or processes that the housekeeping CPU itself needs to attend to). In some examples discussed below, the time period during which the housekeeping CPU delegates certain monitoring and control tasks to the action engine is based on a longest or worst-case response time of the housekeeping CPU that may be expected in the context of the particular dynamic environment being controlled.

In view of the foregoing, in one exemplary implementation of the control system shown in FIG. 4, the action engine 110*a* screens for fast-occurring events by evaluating input signals 66 representing the dynamic environment against conditions 142*a* that benefit from reflexive responses, i.e., responses executed faster than the latency of the housekeeping CPU 190.

Exemplary input signals 66 include, but are not limited to: discrete inputs, such as digital values (bits), analog values, or digital representations of analog inputs; real-time versions of discrete inputs; latched versions of discrete inputs; derived versions of discrete inputs, such as counter values that are derived from a pair of counters clocked in quadrature; and decoded contents of messages (e.g., packets) received from one or more communication ports. The input signals 66 may represent a single parameter (e.g., temperature, pressure, position) constituting a condition of the dynamic environment or a collection of such parameters constituting a condition of the dynamic environment.

To achieve this reflexive behavior, the controller 130*a* of each co-processor 120*a* in the action engine 110*a* compares the input signals 110*a* to a particular condition 142*a* (or set of conditions 142*a*). Unlike a general-purpose processor, each co-processor 120*a* evaluates only the particular condition 142*a* (or set of conditions 142*a*) stored in its memory, which enables the co-processor 120*a* to operate with low (and predictable) latency. If the controller 130*a* determines that the input signals 66 match the particular condition 142*a*, the controller 130*a* executes the corresponding action 144*a*. For example, execution of a corresponding action 144*a* may include transmitting one or more output signals 68 to other devices and/or systems. Alternatively, the action 144*a* may include forwarding an interrupt to the housekeeping CPU 190 to implement the response.

At the same time, the housekeeping CPU 190 monitors the evolution of the dynamic environment through analysis of the input signals 66 and output signals 68. In certain circumstances (e.g., for slow evolutions of the dynamic environment), the housekeeping CPU 190 may respond directly to particular input signals 66 by transmitting its own output signals. In other circumstances, the housekeeping CPU 190 responds indirectly to evolutions of the dynamic environment by re-tasking the co-processors 120*a*, e.g., by updating and/or replacing some or all of the conditions 142*a* and/or (predetermined) actions 144*a* stored in the memories 140*a*. If the dynamic environment is an assembly line, for instance, the housekeeping CPU 190 may re-task co-processors 120*a* originally dedicated to tracking a first part to instead tracking a second part once the first part has moved off the assembly line.

Dividing responsibility between the housekeeping CPU 190 and the action engine 110*a* allows the housekeeping CPU 190 to place the processing burden for the subset of events (e.g., fast-occurring events likely to occur given a particular evolution of the dynamic environment) represented by conditions 142*a* on the action engine 110*a*. At the same time, the housekeeping CPU 190 may continue to process conditions associated with slower evolutions of the dynamic environment. This divide-and-conquer approach may reduce the overall latency and/or jitter (latency variation) of the system's response to events represented by the input signals 66. In some cases, shifting the processing burden for fast-occurring events may also make the latency of the entire control system 100*a* substantially a function of co-processor latency.

Action Engines with Comparator Logic

Figure 5:
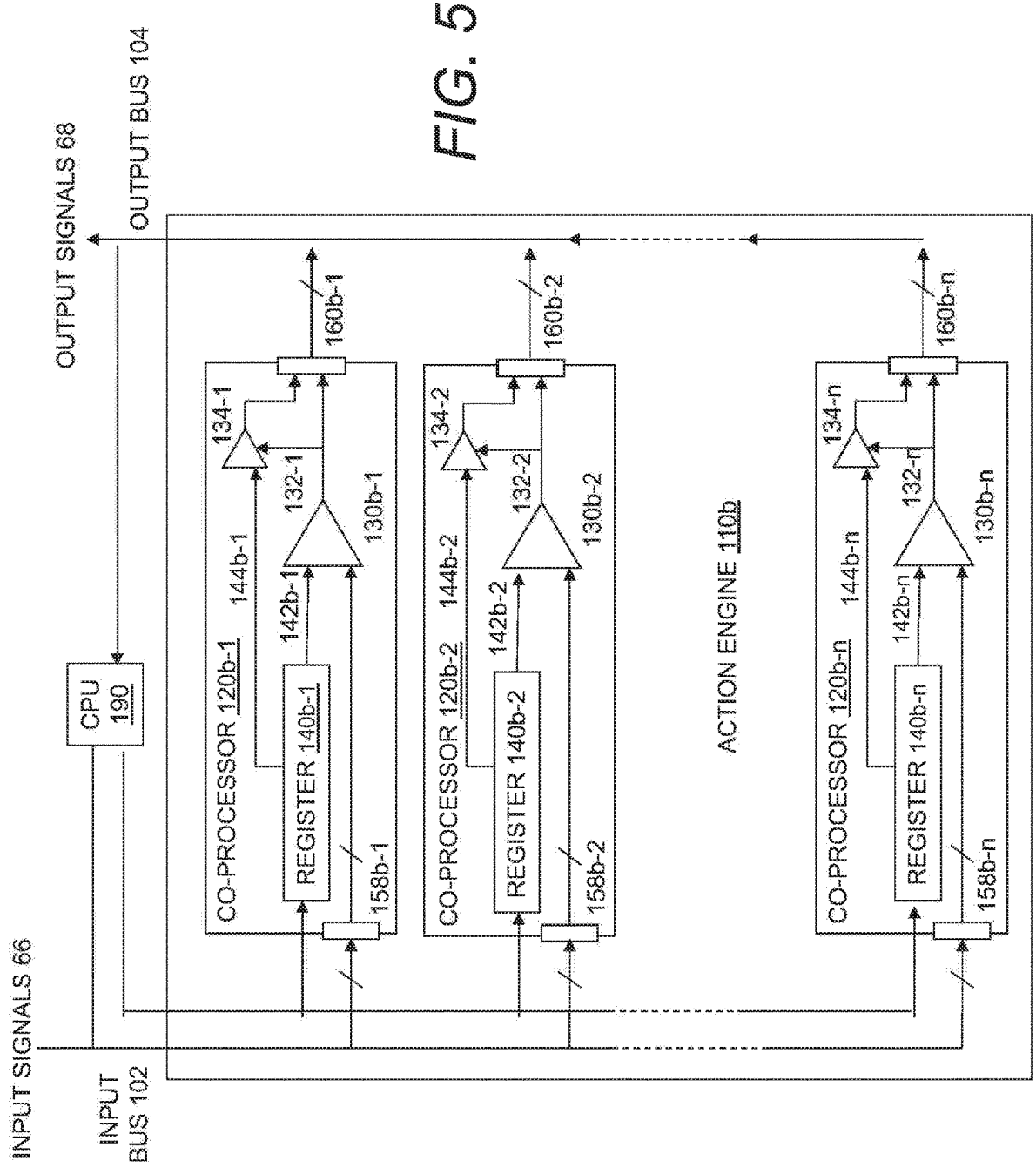
FIG. 5 is a block diagram of an action engine that includes multiple co-processors that operate in parallel to monitor, synchronize, and/or control at least one aspect of a dynamic environment, according to one embodiment of the present invention.

FIG. 5 shows another illustrative action engine 110*b* for monitoring, synchronizing, and/or controlling at least one aspect of a dynamic environment. Examples of such environments with which the system shown in FIG. 5, and particularly the action engine 110*b*, may be employed include, but are not limited to, an assembly line, inspection line, autonomous or semi-autonomous vehicle (or vehicle convoy), power management system (e.g., a smart grid), warehouse, industrial space, parking facility, airport, shipping port, surveillance system, amusement ride, and/or communications network. For instance, the action engine 110*b* may be used for machine control and/or image triggering.

The action engine 110*b* includes multiple co-processors (respectively indicated in FIG. 5 as co-processors 120*b*-1 through 120*b*-*n*; collectively indicated as co-processors 120*b*). Each co-processor 120*b* is a special-purpose computer processor that executes a limited number of operations at high speed, i.e., speeds higher than can be achieved executing the same operations with a general-purpose computer or CPU, e.g., housekeeping CPU 190. Illustrative co-processors 120*b* may be implemented in FPGAs, ASICs, and/or any other suitable implementation known in the art.

Each co-processor 120*b* in the action engine 110*b* includes a respective input port (respectively indicated in FIG. 5 as input ports 158*b*-1 through 158*b*-*n*; collectively indicated as input ports 158) coupled to an input bus 102 that is operably coupled to receive data from sensors, actuators, receive queues (e.g., Ethernet receive queues), and other sources of information about the dynamic environment. Although FIG. 5 depicts n entries, those of skill in the art will readily appreciate that exemplary action engines may have any number of co-processors 120*b*, e.g., 1, 2, 4, 8, 16, 32, 64, 128, 256, 512, or 1024 co-processors 120*b*.

Each co-processor 120*b* also includes a respective register (respectively indicated in FIG. 5 as registers 140*b*-1 through 140*b*-*n*; collectively indicated as registers 140*b*) that stores representations of one or more states or conditions (respectively conditions 142*b*-1 through 142*b*-*n*; collectively conditions 142*b*) and representations of one or more actions (respectively actions 144*b*-1 through 144*b*-*n*; collectively conditions 144*b*) to be executed by the co-processor 120*b* as described below. Each condition 142*b* may be independent of (and possibly overlap with) the other conditions 142*b* in the action engines registers 140*b*. A condition 142*b* may also be contingent upon satisfaction of one or more other conditions 142*b* in the action engine 110*b*—for example, they may be logically "ANDed" together into supersets as described in greater detail below.

The registers 140*b* can be implemented in any suitable type of memory, including but not limited to computer readable storage media such as a volatile or nonvolatile computer memory, flash memories, compact discs, optical discs, magnetic tapes, one or more floppy discs, circuit configurations in FPGAs or other semiconductor devices, or other non-transitory media or tangible computer storage media. Each register 140*b* is dedicated to its respective co-processor 120*b*; that is, the co-processors 120*b* do not share memories. Dedicating a register 140*b* to each co-processor helps reduce or eliminate contention issues.

Each co-processor 120*b* also includes a comparator (respectively comparator 130*b*-1 through 130*b*-*n*; collectively comparators 130*b*) or other logic element(s) that compare input signals 66 received via the input bus 102 and input port 158 to the conditions 142*b*. Because all the co-processors 120*b* have their own comparators 130*b* and receive the inputs 101 simultaneously via the input bus 101, the co-processors 120*b* can compare the inputs 101 to their respective conditions 142*b* simultaneously. As a result, the number of co-processors 120*b* in the action engine 110*b* does not affect the speed with which the comparisons are performed.

If the input signals 66 match the conditions 142*b*, the comparator 130*b* emits an output (respectively outputs 132-1 through 132-*n*; collectively, outputs 132) indicative of the match. It is possible for one, more than one, or none of the co-processors 120*b* to include conditions 142*b* that match the input signals 66. Each co-processor 120*b* may couple its output 132 to an output bus 103 via an output port (respectively output ports 160*b*-1 through 160*b*-*n*; collectively output ports 160*b*).

Each co-processor 120*b* also executes the action 144*b* stored in its respective register 140*b* upon detection of inputs 101 that match its respective conditions 142*b*. The action 144*b* are coupled to a logic element (respectively, logic elements 134-1 through 134-*n*; collectively, logic elements 134) controlled by the output 132 of the comparator 130*b*. When the logic element 134 receives an output 132 indicative of a match between the inputs 101 and the conditions 142*b*, the logic element 134 executes the action represented by the action 144*b*. In some cases, the logic element 134 may transmit additional information or instructions, shown here as output signals 68, to other devices, such as sensors, actuators, and other devices associated with the dynamic environment, via the output port 160*b* and output bus 104. Illustrative output signals 68 include, but are not limited to: discrete outputs, such as digital values, analog values, and/or digital representations of analog values; latched versions of discrete outputs; and/or output data and machine operation commands encoded in message packages sent via one or more communication ports (e.g., output port 160*b*). In other cases, the action 144b may be a "no-op" instructions in which the co-processor 120b does not perform any action.

The action engine 110b is also coupled to a housekeeping CPU 190 via the input bus 102, output bus 104, and additional connections to the registers 140b. (In other embodiments, one or more registers 140b in the action engine 110b may be operably coupled to the housekeeping CPU 190 via input ports 158 and input bus 102.) The housekeeping CPU 190 performs general housekeeping task and loads and maintains the conditions 142b and/or action 144b in the co-processor registers 140b. For example, the housekeeping CPU 190 may replace or update condition/action pairs in one or more co-processors 120b in response to the action engine's identification of a particular state of the dynamic environment, indications that op-codes are out of date, instructions from the action engine, instructions from users and/or other devices, etc. Since the action engine 110b can respond "directly" to inputs from the dynamic environment without necessarily requiring resources from the housekeeping CPU 190, the housekeeping CPU 190 therefore remains substantially free of any processing burden in connection with responding to successive input states (i.e., the housekeeping CPU 190 remains substantially "unloaded"); accordingly, the housekeeping CPU 190 is available when needed to perform tests and actions that may not be possible or practical for the action engine 110b to perform itself. In addition, the housekeeping CPU 190 is not in a critical path for responding to evolutions of the dynamic environment, so it does not delay the action engine's response.

Action Engines with Event Tables and Scanners

Figure 6:
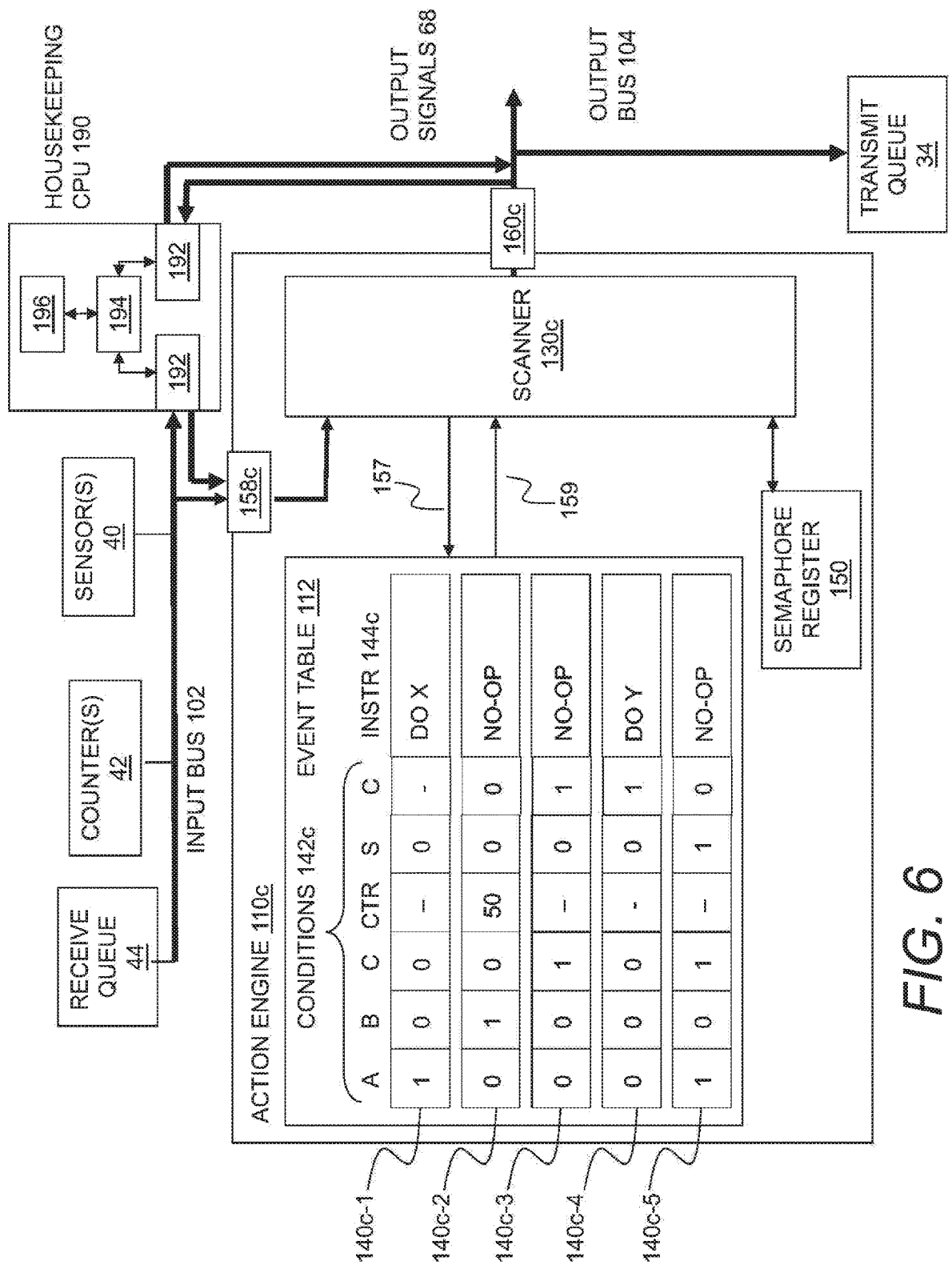
FIG. 6 is a block diagram of an action engine that includes an event table and a scanner that operate to monitor, synchronize, and/or control at least one aspect of a dynamic environment, according to one embodiment of the present invention.

FIG. 6 shows a system configuration of various components, including an illustrative action engine 110c for monitoring, synchronizing, and/or controlling at least one aspect of a dynamic environment. Examples of such environments with which the system shown in FIG. 6, and particularly the action engine 110c, may be employed include, but are not limited to, an assembly line, inspection line, autonomous or semi-autonomous vehicle (or vehicle convoy), power management system (e.g., a smart grid), warehouse, industrial space, parking facility, airport, shipping port, surveillance system, amusement ride, and/or communications network. For instance, the action engine 110c may be used for machine control and/or image triggering.

Figure 8:
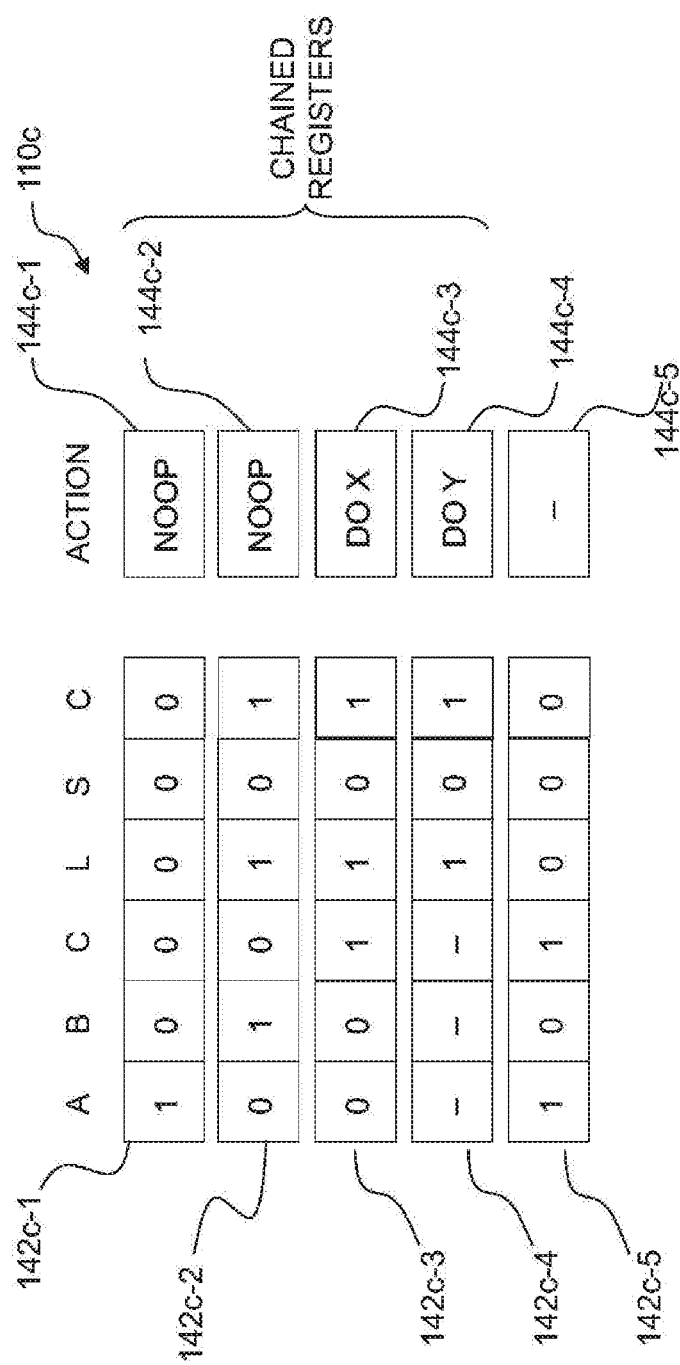
FIG. 8 is a diagram that illustrates the use of chained registers in the event table of FIG. 6, according to one embodiment of the present invention.

The action engine 110c includes an event table 112, which in turn includes event table registers (collectively, event table registers 140c; respectively registers 140c-1 through 140c-5), each of which stores a representation of one or more conditions (collectively indicated in FIG. 6 as conditions 142c; respectively indicated in FIG. 8 as conditions 142c-1 through 142c-5). Each event table register 140c also stores a representation of one or more actions corresponding to the condition(s) stored in the register 140c (collectively indicated in FIG. 6 as instructions 144c; respectively indicated in FIG. 8 as instructions 144c-1 through 144c-5). The event table 112 and event table registers 140c can be implemented in any suitable type of memory, including but not limited to computer readable storage media such as a volatile or nonvolatile computer memory, flash memories, compact discs, optical discs, magnetic tapes, one or more floppy discs, circuit configurations in field programmable gate arrays or other semiconductor devices, or other non-transitory media or tangible computer storage media.

Each event table register 140c stores an independent condition 142c. Taken together, the event table registers 140c can store conditions 142c representing every possible state of the dynamic environment that can be measured by one or sensors 40 coupled to the input bus 110. In many cases, however, the event table registers 140c may hold a reprogrammable subset of conditions 142c, e.g., only those conditions 142c that benefit from actions 144c executed more quickly than the latency of the housekeeping CPU 190. In some cases, the conditions 142c may overlap; for instance, condition 142c-1 may include temperature and pressure thresholds, and condition 142c-2 may include temperature and position thresholds. Although FIG. 6 shows only five event table registers 140c for purposes of illustration, it should be appreciated that, in other embodiments, an event table 112 may have more or fewer registers 140c, e.g., tens, hundreds, or even thousands of entries. In general, virtually any number of conditions 142c germane to a particular environment, pursuant to which some response/reaction may be required, may be represented in an event table 112 as an event table register 140c.

In addition to representations of conditions 142c, each event table register 140c also includes representations of one or more actions 144c to be carried out if the state input matches the condition(s) 144c. Accordingly, if a scanner 130c of the action engine 110c determines that the input signals 66 match a given condition 142c stored in an event table register 140c, the scanner 130c accesses the corresponding action(s) 144c stored in the event table register 140c, and executes the action(s) 144c so as to control one or more aspects of the dynamic environment. To this end, the action engine 110c also includes an input port 158c, an output port 160c, and/or one or more other communication interfaces (e.g., input/output buses, Ethernet ports) to communicate instructions accessed in the event table to one or more external devices, as well as receive the state input, as well as other information relevant to the dynamic environment, from one or more sources of such information.

As shown in FIG. 6, the action engine 110c further comprises a scanner 130c coupled to the event table 112 via connections 157 and 159. The input port 158c provides a connection from the event table 112 and scanner 130c to an input bus 102. FIG. 6 also illustrates that the input bus 102 of the action engine 110c is coupled to a variety of external devices, including (but not limited to) a CPU 190, as well as a semaphore register 150, a counter 42, one or more sensors 40, and a communications interface in the form of a receive queue 44 (e.g., an Ethernet receive queue). The scanner 130c, which is also connected to the input bus 102, includes digital logic (not shown in FIG. 6) that compares the set of conditions 142c in each event table register 140c to input signals 66 coupled to the input bus 102 from the housekeeping CPU 190, the counter 42, the sensor(s) 40, the receive queue 44, and/or any other suitable data source. In some cases, the input signals 66 may include data derived from the dynamic environment by one or more embedded application systems, such as a processor that evaluates image data from a camera, position information from a robotic controller, and/or flow information from a mixer or flow control system in a continuous process chemical reactor. In some implementations, pre-conditioning or pre-processing raw data may reduce the number of bits required to represent the data, which in turn makes it possible to reduce the size of the registers 140c.

Figure 7:
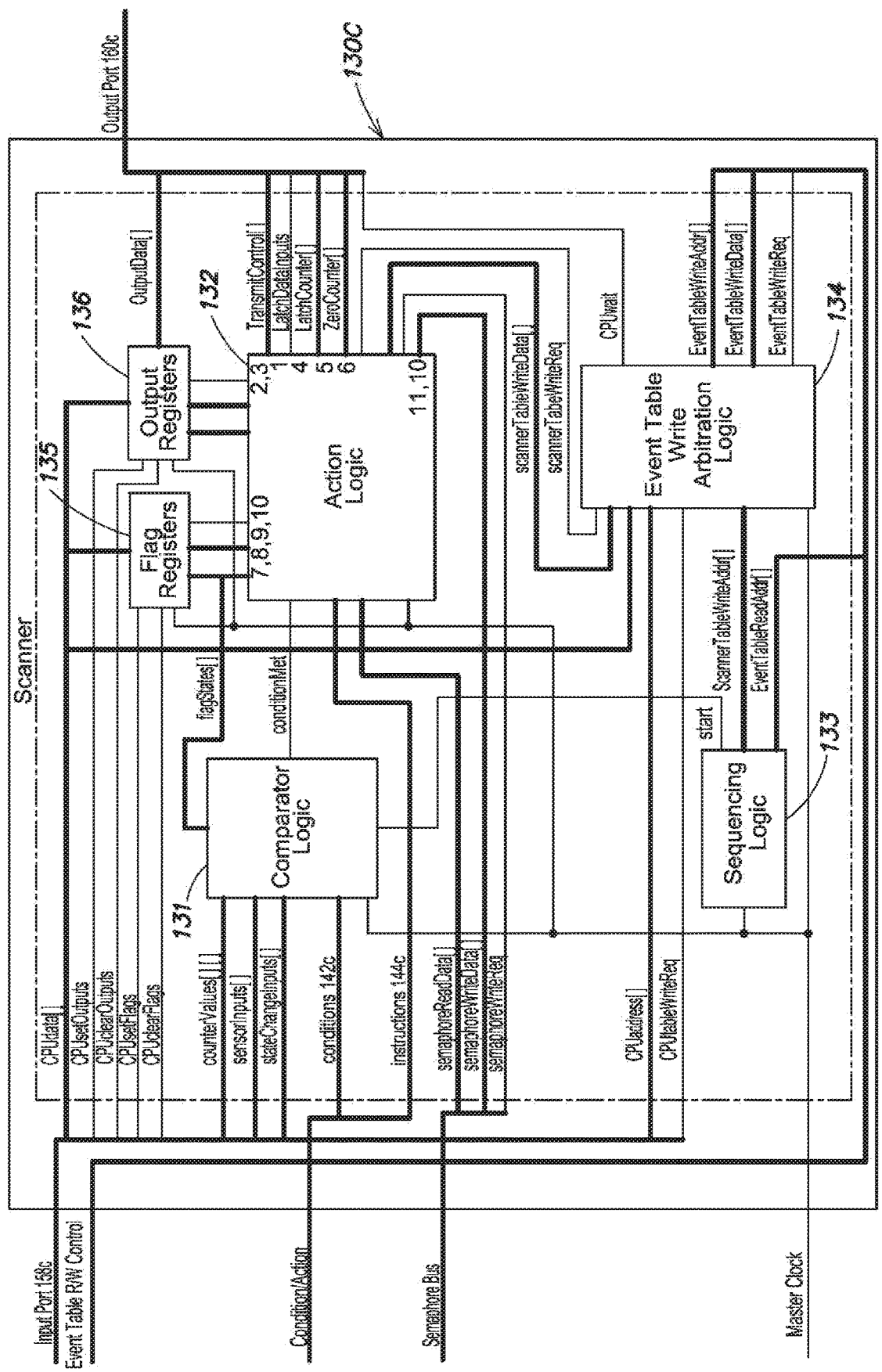
FIG. 7 is a block diagram of a scanner suitable for use in the action engine of FIG. 6, according to one embodiment of the present invention.

FIG. 7 is a block diagram that shows one possible embodiment of the scanner 130c in greater detail. The scanner 130c includes comparator logic 131 that is coupled to action logic 132, sequencing logic 133, and one or more flag registers 135. Input signals 66, including but not limited to counter 42 value(s), sensor 40 value(s), state change inputs, and flag states, are evaluated by the comparator logic 131 with respect to the data representing conditions 142c from the event table 112 to determine if the conditions 142c are met. This "condition met" status is passed to the action logic 132.

Referring again to FIG. 7, the scanner 130c also includes action logic 132 that receives the "condition met" status from the comparator logic 131 along with data representing instructions 144c from the event table 112. The action logic 132 is also coupled to one or more flag registers 135, semaphore registers 150 (FIG. 6), output registers 136, communication logic (not shown), counters, and data input circuitry. Depending on the state of the "condition met" status and the data representing instructions 144c, the action logic 132 may perform operations affecting the state of the flag registers 135, semaphore registers 150, output registers 136 coupled to an output port 160b, communication logic 34, counters, and data input circuitry, as delineated in more detail below. In addition, the action logic 132 is coupled to event table write arbitration logic 134, which facilitates the changing of conditions 142c and/or instructions 144c in the event table 112, when, for example, an action has been executed and further evaluations of the condition/action pair are to be inhibited.

The sequencing logic 133 in the scanner 130c (FIG. 7) synchronizes the activities of the comparator logic 131, the action logic 132, and the event table 112 (FIG. 6). It provides the read address to the event table 112, which determines which register 140c in the event table 112 is to be evaluated. The sequencing logic 133 also provides the write address to the event table write arbitration logic 134 when the action engine 110c determines that conditions 142c and/or instructions 144c in the event table 112 are to be modified. The event table write arbitration logic 134 receives inputs from the housekeeping CPU 190 as well as from other logic within the scanner 130c to govern write activity to the event table 112. When contention arises between write operations from the CPU 190 and write operations from other logic within the scanner 130c, priority may be given to the logic within the scanner 130c so that the scanner operation can continue uninterrupted. In this case of contention, a wait signal is asserted to the housekeeping CPU 190 so that the CPU write operation is suspended until the event table write arbitration logic 134 determines that the event table 112 is available to accept the write data from the CPU 190. In one embodiment of the scanner 130c, the sequencing logic 133 causes a new condition/action pair to be evaluated on every cycle of the master clock (not shown).

In various aspects, the scanner 130c and event table 112 may be implemented in a single co-processor, e.g., in an FPGA using a working hardware description language (HDL) code. The scanner 130c may also be implemented as a unitary digital logic structure coupled to the one or more storage media in which the event table is stored. Alternatively, the scanner 130c may be implemented as multiple distributed logic components communicatively coupled to the event table. For example, in one embodiment, the scanner 130c may be implemented as multiple digital logic components respectively dedicated to one event table register 140c, such that there is a one-to-one correspondence between an event table entry and dedicated digital logic to compare input signals to one or more conditions in a given event table register and access one or more corresponding instructions as appropriate. In yet other embodiments, digital logic components constituting a portion of the scanner may be dedicated or assigned to particular groups of multiple event table registers. Accordingly, it should be appreciated that the scanner of the action engine, and the digital logic circuits constituting the scanner, may be implemented in any of numerous ways according to various embodiments of the present invention.

In one exemplary implementation, the scanner of the action engine compares the state input substantially simultaneously (e.g., in parallel) to multiple sets of conditions in the event table so that appropriate instructions for responding/reacting to the state input may be accessed (and in turn communicated to one or more external devices) with appreciably high speeds. As a result, the action engine exhibits a significantly low latency with respect to processing information relating to respective states of the dynamic environment and taking actions in response to same.

For instance, the scanner 130c may be implemented as a state machine that processes a single register 140c every two clock cycles. During the first clock cycle, the scanner 130c reads the condition 142c. The scanner 130c performs the corresponding action 144c during the second clock cycle if the condition 142c is met. The second clock cycle may involve a write back to the action 144c in the event table 112 to indicate that the appropriate operation has been completed for the next scan. Implementations that involve especially complex conditions and/or a large number of input states may use more than two clock cycles to process a single register. In scanners 130c that use multi-cycle executions, a dual ported memory having concurrent read and write cycles can be implemented, where the write cycle writes back the register 140c processed during a previous read cycle. State machine pipeline registers (as described below) in conjunction with the concurrent read and write cycles of the dual port memory will allow a new register to be processed every cycle, significantly reducing latency.

Referring again to FIG. 6, it should be appreciated that a set of one or more input signals 66, provided on the input bus 102 of the action engine 110c, may be obtained from a variety of sources coupled to the input bus 102 (e.g., the housekeeping CPU 190, the counter(s) 42, the sensor(s) 40, etc.) and may be provided by a single source at a given time or multiple sources at a given time. Such a set of one or more input signals 66 may, at least in part, represent the dynamic environment at a given point in time, and these input signals 66 may be compared (e.g., by the scanner 130c) to each of the sets of conditions 142c stored in respective event table registers 140c.

The input signals 66 are evaluated constantly to detect a change of state (rising or falling edge). At the beginning of each scan of the event table 112, any input state changes discovered during the previous scan are presented as latched inputs (not shown) to the scanner logic. This means that any signals that pass through the input filters will be detected, no matter how short their duration. Hence any change of state for any input signal can be presented to the scanner logic, even if their duration of the state change is shorter than the duration of a scan.

In one exemplary implementation of the action engine 110c shown in FIG. 6, if the set of input signals 66 provided on the input bus 102 matches the condition(s) 142c for a particular event table register 140c, the scanner 130c executes the corresponding action 144c from that event table register 140c. In some cases, these actions 144c may include acquiring or releasing a semaphore, or setting or clearing a flag coupled to the scanner 130c, which uses the semaphore or flag to evaluate conditions 142c as described in greater detail below. The scanner 130c in turn transmits output signals 68 corresponding to a matched set of conditions to the dynamic environment, the housekeeping CPU 190, and a transmit queue 34 (e.g., an Ethernet transmit queue) via an output bus 104.

Alternatively, or in addition, the scanner 130c may be operably coupled to various peripherals. For example, the scanner 130c may reset or latch counters, latch input registers, set or clear output registers, or load entries into the transmit queue 34. In the case of multiple scanners, various ways of handling contention may be employed. For instance, reset/latch/set/clear input contention can be handled by OR gates. The transmit queue 34 may be dedicated to the scanner 130c and have its own circuit process for managing data. The scanner 130c may alternatively share the transmit queue 34 (possibly with other scanners 130c), and the circuit process may manage ownership of the queue 34.

In some cases, the actions 144c are executed to one or more devices external to the action engine 110c (e.g., via one or more communication interfaces of the action engine) as a data packet (e.g., as employed in various packet-mode computer networks, such as TCP/IP packets). In implementations in which data packets are employed to transmit instructions relating to actions 144c, in some embodiments the contents of such packets may include not only the instructions themselves, but additional data (e.g., metadata) that relates in some manner to the instructions, the set of conditions corresponding to the instructions, and/or one or more other aspects of the dynamic environment. The additional data may include, but is not limited to, address information (e.g., an Ethernet media access control (MAC) address header) and/or payload buffers, which may be filled in by the housekeeping CPU 190 in a location referenced by an index stored in the event table register 140c.

In some implementations, the action engine 110c selects or generates such data for inclusion in a packet payload (e.g., based on monitoring various information sources coupled to the input bus 102, and/or based on various information that may be stored in memory in addition to the event table 112). For example, when a given condition 142c is satisfied, the scanner 130c may select a corresponding payload buffer based on an index stored in the corresponding register 140c, then copy corresponding payload buffer to the transmit queue 34. In other cases, the data may include the number of a part being tracked through an assembly or inspection line. Alternatively, the data may include information about one or more data sources (e.g., the location and/or orientation of a camera serving as a sensor 40 and providing image information for evaluation) and/or the data may be associated with and/or represent some aspect of the state input itself (that is compared to sets of conditions stored in the event table).

Master Processor ("Housekeeping CPU")—Programming and Operation

In embodiments of a system configuration employing the action engine 110c and various other components, such as shown in FIG. 6, the housekeeping CPU 190 loads and maintains the conditions 142c and instructions 144c in the event table 112. In some cases, the housekeeping CPU 190 may replace some or all of the conditions 142c and the instructions 144c in the event table 112 in response to an evolution of the dynamic environment (i.e., changing conditions as a function of time). Since the action engine 110c can respond "directly" (e.g., autonomously, without intervention of the CPU 190) to input signals representing conditions of the dynamic environment without necessarily requiring resources from the housekeeping CPU 190 (e.g., during time periods in which the action engine is commissioned to evaluate particular conditions), the housekeeping CPU 190 therefore remains substantially free of any processing burden in connection with evaluating these particular conditions; accordingly, the housekeeping CPU 190 is available to attend to other processes (e.g., perform tests and actions that may not be possible or practical for the action engine 110c to perform itself).

With respect to commissioning the action engine 110c to evaluate particular conditions during a given time period (or more generally, tasking one or more co-processors with evaluating one or more conditions), in one embodiment the housekeeping CPU 190 is configured to allocate tasks to co-processors by segregating application-specific machine coordination algorithms into distinct (e.g., orthogonal) procedural steps distinguished by their being conditional on the passage of time (e.g., either a known period of time, or an unknown period of time that may occur given its being conditional on a collection of future external inputs or a particular sequence of monitored conditions). To this end, and with reference again to FIG. 6, the housekeeping CPU or master processor 190 includes one or more communication interfaces 192 and/or one or more input/output (I/O) ports for receiving input signals 66 representing conditions of the dynamic environment (as a function of time), as well as one or more processing units 194 and memory 196 to store processor-executable instructions, and various program data as necessary, for the processing unit(s) 194 to implement orthogonal procedural steps for controlling an action engine (or more generally one or more co-processors according to various embodiments).

Procedural steps as disclosed herein can be executed independently of each other (e.g., by the processing unit(s) 194 of the master processor 190) completely in parallel and in any order as their conditions are met (e.g., particular conditions are evaluated by either the master processor 190 or the action engine 110c to initiate a given procedural step). Each procedural step may include one or more of the following: 1) starting one or more processes, or instances of one or more processes; 2) stopping one or more processes, or instances of one or more processes; 3) performing one or more mathematical transformations; 4) presenting one or more outputs; 5) transmitting one or more messages, e.g., between the housekeeping processor 190 and one or more action engines 110c, between action engines 110c, to devices in the dynamic environment, and any other specified destinations; 6) acquiring or releasing binary semaphores to allow multiple processes to guarantee mutual exclusion from desired sections of program code; 7) latching the state of peripherals, such as the inputs and counters; and 8) setting or clearing "flag" variables for inter-process synchronization and communication. (Flag variables may be Boolean variables that are implemented by register peripherals that the event-table scanners have access to as opposed to variables stored in the master processor's memory.)

In one embodiment of the present invention, computer-implementable instructions (e.g., written in the SCORE™ programming language) encoded on non-volatile, non-transitory computer-readable media accessible by the master processor 190 describe machine coordination tasks specific to each real world application (e.g., generation of output signals from one or more co-processors/an action engine to ultimately control various equipment in the dynamic environment). These instructions cause the master processor 190 to implement one or more processes, or state machines, possibly using one or more action engines 110c and/or one or more co-processors. Each process may also be implemented multiple times by the same system, either in parallel, in sequence, or both. Concurrently executed copies of a given process are known as "instances" of the process, with each instance executed by a different slot 140 or set of slots in the action engine 110c or different co-processor.

Each process can be considered as a state machine, with each state in the state machine corresponding to a particular condition of the dynamic environment. The processes (state machines) include one-shot processes, which are executed once, and continuous processes, which are performed (e.g., repetitively) without interruption. Both one-shot and continuous processes may be halted or terminated before finishing, e.g., in response to a command from the master processor 190 or other source or upon reaching a predetermined point in the sequence of computer-implementable instructions.

Each state machine includes one or more states, each of which may be implemented as a "wait" statement, executed by an action engine/co-processor, during which the action engine/co-processor monitors the dynamic environment for the occurrence of the particular condition. In one significant aspect, the computer-implementable instructions include a particular definition of a "wait" statement, having as arguments one or more conditions of the dynamic environment that, when satisfied, trigger execution of one or more actions and a notification of the master processor that the condition has been met. The "wait" statement essentially specifies that one or more actions will be executed when one or more real world conditions are met. The housekeeping processor 190 may off-load wait statement conditions and associated actions that are compatible with the action engine's operations to the action engine. Pursuant to the programming language once compiled to be executed by the processing unit(s) 194 and the master processor 190, blocks of instructions between wait statements are executed by the action engine/co-processor and/or the master processor 190 until the next wait statement. For example, an action engine may execute one or more actions directly following a wait statement provided that those actions are compatible with the action opcodes of the co-processor.

In at least one implementation, a wait statement causes the progress of a process to pause until the condition clause is satisfied. This enables the master processor 190 to schedule processes by querying the current wait statement condition of each process and continuing a process when its condition is satisfied. Wait statements can have the format "wait for <Boolean-expression>," where <Boolean-expression> represents a condition of the dynamic environment. Subroutine calls may be made as desired to evaluate the condition of the statement. For instance, the condition may involve evaluation of a Boolean counter condition. Counter variables can accessed by name, optionally preceding the counter name with the keyword counter. Counter comparisons can be made from an initial value, such as a belt position when a part detect signal is generated. Automatically declared counter time can also be used to compare durations precisely (e.g., with microsecond precision). Some examples include (hash marks "#" indicate comments):

```
wait for total > 2;
wait for canContinue( ); # the subroutine canContinue returns a Boolean
wait for computeTotal( ) > 99
wait for counter position >= 100 from detectLocation
wait for time >= 100us from detectTime; # includes "from" keyword
wait for flagA and flagB or booleanC
```

The "from" keyword removes the need for the developer to worry about counter roll-over for applications where a counter reset is not desirable.

A wait statement may also be used to wait for a particular time period to elapse by using the argument <duration-expression>: "wait for <duration-expression>." This time period may be expressed as an absolute value, such as a time in milliseconds; a relative period, such as a time period required by another process; or a time expressed as a variable. If the expression involves calling subroutines or evaluating variable values, those variable values are evaluated only when the wait statement is processed the first time. Some examples include:

```
wait for 1ms;
wait for pauseDuration; # where the variable is type timespan
wait for computeWaitTime( ); # will call the subroutine once
```

A wait statement may also be used to wait for a rising or falling edge of a particular input: "wait for <edge> of input <input>." The input given can be either the input index or the named input which would be previously declared. Multiple inputs can be given with an edge on any one of them satisfying the condition. Named and indexed inputs can be mixed in the OR'd list of inputs. Multiple inputs can be separated by either the OR keyword or a comma. Input indexes start at 0. Some examples include:

```
wait for rising edge of input 0
wait for falling edge of inputs PartDetect, DisableSwitch
wait for rising edge of input 1,2,3 or 4 or DisableSwitch
```

A wait statement may also be used to wait for one or more inputs to change to a desired state (e.g., a set state or a cleared state): "wait for <state> input(s)<input-list>." The "AND" keyword may be used to indicate all inputs are required to be in the desired state to satisfy the condition. Similarly, the "OR" keyword may indicate that the condition is satisfied if any of the inputs reaches the desired state. Some examples include:

```
wait for set input 3
wait for set input 3, 12 and Enable
wait for set inputs 3 and 12 and Enable
wait for clear inputs inProgress or Abort
```

A wait statement can be used to wait for one or more flags to be set or cleared: "wait for <state> flag(s)<flag-list>." This is analogous to waiting one or more inputs to be set or cleared as above. Multiple flags can be given and the "flag" keyword can be used in the plural form for readability. Flags are indicated by a declared flag variable. Some examples include:

```
wait for set flag goAhead;
wait for set flags doneA, doneB and doneC
wait for set flag finished set or finished clear
wait for cleared flag available[i]
```

A wait statement can be used to wait for one or more trigger ladder to fire: "wait for trigger ladder <integer-expression>." A trigger ladder may be specified by its index., with trigger ladder indexes starting at 0. Examples include:

```
wait for trigger ladder 1
wait for trigger ladders 1 or 3
wait for trigger ladders 0, 1, 2 or 3
```

Other types of wait statements include, but are not limited to:

- Waiting for a quadrature encoder counter to decrease: "wait for decreasing counter <counter>." This may be used with another condition, such as a rising edge of a part detection input;
- Waiting a for quadrature encoder counter to increase: "wait for increasing counter <counter>". This may also be used with another condition, such as a rising edge of a part detection input;
- Waiting for a previous send statement in the same process to complete transmission "wait for send (sender) to finish". For example, it may be used to wait for an Ethernet SureSync™ event transmission to finish before the process modifies the payload so as to avoid corrupting the payload for the transmission in progress;
- Waiting for messages to arrive at an event packet receiver ports in the co-processor or action engine: "wait for message." The device IDs of the sending devices may be either stored in the power on configuration or configured at runtime by a host computer. If the event sender is relevant, the wait statement can be followed by an "if-else if" statement that switches on the message port value. In certain embodiments, a process that waits for a message will not wait for anything else. This enables the process to either run continuously or wait for a message, which in turn enables the scheduler to give a received message to the process. If the scheduler reads a message from a receiver peripheral and there is no process waiting for a message, however, the message may be discarded.

Multiple conditions can be combined together so that all must be satisfied at the same time before the wait statement is completed. This can done by combining the "for" clauses in the wait statement with the "AND" keyword. Examples include:

```
wait for set flag goAhead and for set input Enabled;
wait for set input Enabled and for counter ticker > 100;
```

In some instances, the action engine/co-processor may not execute a wait statement until all outstanding message sends have been completed. For communication with a 1×1 device, which may have a high latency in performing a message acknowledgement/no acknowledgement handshake, this can result in delays of over a millisecond. If this is not desirable, a separate one-shot process may be used to send the message, removing this latency from the main process.

In general, the master processor 190 delegates as many conditions as possible to the action engine(s) 110c and/or co-processors. Typically, the master processor 190 assigns one condition to each slot 140 in the event table 112 of the action engine 110c and/or to each co-processor. It may assign the conditions to the respective slots 140 and/or co-processors based on the initial compiling of the instructions, a desired latency, the capabilities of the action engine 110c and the co-processors, the conditions themselves, and/or its own capabilities. For instance, the master processor 190 may determine a first subset of conditions for evaluation by a particular co-processor based on at least one of: a time period in which the first subset of the plurality of conditions is expected to occur in the dynamic environment; a particular sequence in which the plurality of conditions is expected to occur in the dynamic environment; at least one previous action taken in the dynamic environment; a present state of the dynamic environment; a response time of the master processor; and at least one attribute of the at least one co-processor (e.g., functioning status, processing speed, memory size, input signal number, input signal type, output signal number, and output signal type). In some examples, the co-processor is configured to evaluate a number of conditions that is smaller than some fixed maximum number of conditions, which may be based at least in part on a maximum permissible latency defined by a required response time in the dynamic environment The master processor may also re-assign conditions dynamically, e.g., in response to the evolution of the dynamic environment, new instructions, and/or previously stored instructions. By delegating conditions to the action engine(s) 110c and/or co-processors, the master processor 190 can perform other processing tasks instead of monitoring the conditions in a serial fashion. For example, the master processor may configure a given co-processor at a first time to evaluate only first subset of conditions and to provide control information representing the first action in a plurality of actions if the first subset of conditions is satisfied. Later, at a second time, the master processor reconfigures the co-processor to evaluate only a second subset of conditions and to provide additional control information representing another action if the second subset is of conditions is satisfied. In some cases, the master processor may determine the second subset of conditions based at least in part on whether or not the first subset of conditions is satisfied. In at least one of these cases, the master processor determines the second subset of conditions based on at least one of: a time period in which the second subset of conditions is expected to occur in the dynamic environment; a particular sequence in which the conditions is expected to occur in the dynamic environment; a present state of the dynamic environment; at least one previous action taken in the dynamic environment; and the master processor's response time. The master processor may determine the second subset of conditions based on at least one of the co-processor's attributes, which include but are not limited to: the co-processor's functioning status (e.g., idle, active, etc.); a first number of the input signal processed by the co-processor; a first type of the input signal processed by the co-processor; a second number of the output signal processed by the co-processor; and a second type of the output signal processed by the co-processor.

In one aspect, the master processor 190 determines how to delegate conditions (and possibly actions as well) according to compiled computer-implementable instructions from an optimizing compiler (not shown). As understood by those of skill in the art, the compiler transforms the user-written source code (e.g., in the SCORE™ programming language) into a target language, such as object code, that can be executed by the master processor, the action engine(s), and/or the co-processor(s). In performing this transformation, the compiler may compile the source code in the order presented in the source code and produce object code with similar or roughly analogous ordering.

The compiler may also analyze the state machine(s) generated by compiling the source code, e.g., by going from state to state along the edges (actions) connecting the states (wait statements/conditions). In one example, a user supplies the compiler with a profile of the available action engine(s)

and/or co-processor(s), e.g., by providing command-line arguments to the compiler. The compiler uses this profile to designate certain conditions and certain actions in the compiled object code as within the capabilities of the available action engine(s) and/or co-processor(s). The master processor may assign these conditions (and possibly the actions as well) to the action engines or co-processors designated in the compiled object code. In some embodiments, the compiler determines these allocations of action engine/co-processor resources to designated conditions (and actions) at compile time, and these allocations remain static.

In other embodiments, the master processor may allocate or re-allocate action engine/co-processor resources to designated conditions (and actions) in a dynamic fashion, e.g., in response to the evolution of the dynamic environment or changes in system or component status. In such a dynamic environment, the master processor may create and/or maintain a profile of the available action engine/co-processor resources. For instance, the master processor may obtain information about the available action engine/co-processor resources by polling the operably coupled action engine/co-processor device(s), by receiving status updates from the operably coupled device(s), and/or by receiving the profile from a user via command-line arguments or any other suitable interface.

The master processor 190 may also create and maintain a list of processes (state machines), including the status (state(s)) of those delegated in whole or in part to the action engine(s) 110c and those that it reserves for itself. During operation, the master processor 190 uses this list to advance each of the state machines implemented by the system. For example, a given co-processor may be tasked with monitoring the dynamic environment for a particular condition (e.g., the arrival of a part at a designated point in an assembly line). The process then enters a "wait" state during which it monitors the dynamic environment for the condition. When the co-processor determines that the condition has been met (e.g., the part arrives at designated point), the process exits the wait state to perform a predetermined action (e.g., it instructs a camera to take a picture of the part). The co-processor also notifies the master processor 190 that its condition has been met by transmitting a notification signal ("notification" for short) to the master processor 190. For instance, the co-processor may generate a match signal if a particular condition of the dynamic environment matches the condition monitored by the co-processor and provide the match signal to the master processor as the notification signal.

Upon receiving a notification signal (match signal) from the co-processor that a condition has been met, the master processor 190 advances those state machines waiting for the notification on its list of state machines, including the one implemented by the co-processor. Depending on the state machine, the master processor 190 may note that the condition has been met and allow the co-processor to continue implementing the process, or it may halt the state machine (process) implemented by the co-processor and cause the co-processor to implement another state machine. It may also use the notification to start, halt, or advance other state machines implemented by the system.

In sum, in some implementations, the wait statement condition evaluated by the co-processor for a single processor may have several sub-conditions combined with Boolean logic followed by one or more procedural steps to be taken on satisfaction of the condition as a whole and/or sub-conditions; this is what the co-processor is commissioned to do for a single process instance at any given time. When the condition is satisfied and the actions are completed, the co-processor notifies the master processor, which can re-commission the co-processor for the next wait statement in the process.

Each state (condition) may have associated with it at least one particular action. If possible, the master processor 190 also delegates the action(s) associated with a particular condition to the same slot 140 or co-processor assigned to monitor the particular condition. In some embodiments, the master processor 190 delegates actions involving inputs and outputs to the action engine 110c and/or co-processors 140. These actions may include, but are not limited to: sending packets, setting outputs, clearing outputs, adding outputs, latching counters, setting flags, clearing flags, acquiring semaphores, releasing semaphores, and no operations (no-ops). In some cases, the master processor 190 delegates actions based on the capabilities of the slot 140 or co-processor assigned to monitor the associated condition. It may also assign the condition to the slot 140 or co-processor based on the associated action and the ability of the slot 140 or co-processor to perform the associate action.

The master processor 190 may also delegate a condition to a slot 140 or co-processor while reserving execution of the associated action to itself. For instance, the master processor 190 may execute all actions related to accessing information in memory, including but not limited to: storing information in memory; retrieving information from memory; incrementing variables in memory; and arithmetic involving numbers stored in memory. The master processor 190 may also execute other types of actions as well on an as-needed or as-desired basis.

Below are several pseudo-code examples of processes (state machines) and sub-processes suitable for implementation using the systems and devices disclosed herein, including the system shown in FIG. 6. Hash marks (#) indicate comments in each example.

Example 1: Continuous One-State Process

```
continuous process send_on_edge with instances i := 0..7
begin
    wait for rising edge of input i      # state (condition no. 1)
    send sender i      # action (executed by co-processor)
end
```

Example 1 is a continuous process, called "send_on_edge," in which a co-processor is tasked with waiting for a rising edge (the condition) of input i and sending a packet (the action) to another device upon satisfaction of the condition. The co-processor also notifies the master processor that its condition has been met upon detecting the rising edge. In this example, once the co-processor has sent the packet, the master processor reloads the same condition and action opcode pair in the co-processor's memory. The co-processor continues to monitor the rising edge of input i until the co-processor is halted or interrupted, e.g., by the master processor 190. This process is implemented eight times (i=0 . . . 7), with each instance running on a separate slot in the action engine or on a corresponding co-processor.

Example 2: Continuous Two-State Process

```
continuous process send_on_pulse with instances i := 0..7
begin
    wait for rising edge of input i   # state no. 1 (condition no. 1)
    send sender i       # action no. 1a (executed by co-processor)
    set output i+8      # action no. 1b (also executed by co-processor)
    wait for 100ms      # state no. 2 (condition no. 2)
    clear output i+8    # action no. 2 (executed by co-processor)
end
```

Example 2 is a continuous process, called "send_on_pulse," in which a co-processor alternates between two states depending on the evolution of the dynamic environment. In the first state, the co-processor waits for a rising edge to appear on input i as in Example 1 (this is the first condition of this process). Once the co-processor detects the input, it sends a packet to another device and notifies the master processor that the first condition has been met as above. It also performs another action—it sets output i+8—before proceeding to its second state ("wait for 100 ms"). In this second state, the co-processor waits for occurrence of the second condition, elapsation of 100 ms. Once this condition is met (i.e., once 100 ms has elapsed), the co-processor performs its second action—clearing output i+8—and notifies the master processor that the second condition has been met. It then transitions back to the first state to wait for the first condition to occur again. Like the process in Example 1, the Example 2 process continues until it is halted or interrupted, e.g., by the master processor 190. It is also implemented eight times (i=0 . . . 7), which each instance running on a separate pair of slots in the action engine or on a corresponding co-processor.

Example 2 is performed with at least two slots in the action engine because it involves two actions associated with one condition—both "send sender i" (action no. 1a) and "set output i+8" (action no. 1b) are triggered by satisfaction of "rising edge on input i" (condition no. 1). Condition no. 1 and action no. 1a are loaded into the first slot, and action no. 1b is loaded into the second slot, which is chained to the first slot. The second slot is also loaded with the condition "do always" which is implemented as "counter[0]>=0," and which causes it to execute whenever condition no. 1 is met (see below for a more detailed discussion of "chaining" slots together).

Example 3: Continuous Process with Master Processor Action

```
continuous process send_sequence with instances i := 0..7
begin
    static unsigned integer sequence := 0      # declaration
    payload p;  # declaration
    p.dword[0] := sequence; # master processor action
    wait for rising edge of input i       # condition no. 1
    send sender i with payload p   # action no. 1a (co-processor)
    sequence++; # action no. 1b (master processor)
    wait for sender to finish   # condition no. 2; action 2 is a no-op
end
```

Example 3 is another continuous process, entitled "send sequence," in which a co-processor monitors conditions and the co-processor and the master processor each execute actions in response to detection of the conditions. In this case, the process begins with the declaration of a static variable named "sequence" ("static unsigned integer sequence") and a 16-byte payload p that goes out with every event packet. Once these have been initialized, the master processor sets a word ("p.dword") in the payload to the value of the "sequence" variable. The co-processor then enters a wait state in which it monitors the dynamic environment for a rising edge on input i. When it detects the rising edge, it notifies the master processor that its condition has been met and sends the payload, which may trigger a camera or other device that receives the payload.

Upon receiving the notification that the condition has been met, the master processor increments the variable "sequence." The master processor performs this action because incrementing a variable involves accessing information in memory, which is often beyond the capabilities of an action engine or a co-processor. The master processor also advances the state machine to its next state, in which the co-processor waits for the sender to finish its action. If the co-processor detects fulfillment of this condition, it performs the corresponding action. In this case, the corresponding action is a "no operation," or "no-op," so the code does not include a specific command. The co-processor also notifies the master processor that the condition has been met, and the master processor advances the state machine to its next state (here, back to the "wait for rising edge of input i" state) in response to the notification. Like the processes in Examples 1 and 2, the Example 3 processes runs until it is halted or interrupted and is implemented in eight separate instances.

In example 3, condition no. 2 ("wait for sender to finish") is intended to prevent procedural statements from overwriting a payload buffer (p in Example 3) until the send is completed, which happens in a non-deterministic time period due to network contention and variance in communication protocol latency. This is because the co-processor might not be able to get access to the desired physical network resource when a send action is used. There are several possible ways to deal with access issues, including but not limited to: (a) adding queues to store the payloads and port numbers for storage before processing; (b) holding the notification to the master processor until the send has completed; and (c) adding another notification to the master processor that the send has completed and notifying the master processor of the condition satisfaction and action completion immediately. Option (a) may not be optimal in field-programmable gate array (FPGA) implementations due to FPGA resource restriction. Option (b) may introduce extra delay because a send completion can take up to 1 ms due to slow handshaking speed in the event message protocol with non-real time peers (e.g., host computers running MS Windows®). Option (c) allows the master processor to run non-co-processor-compatible actions after a wait statement immediately, but prevents the master processor from modifying the event-table slots until the send has completed. In some implementations, each wait statement has an implicit "wait for send to finish" since the slots cannot be overwritten until all send statements ahead of the wait statement have been completed.[0136] In some cases, including the one illustrated in Example 4 below, the master processor evaluates a "flow control statement," such as an "if" statement, to determine how to advance the state machine. For instance, the evaluation may yield a first result that causes the master processor to advance one or more state machines to particular first states or a second result that causes the master processor to advance one or more state machines to particular second states. Flow control statements may also be used to decide to interrupt, pause, or halt on-going processes and to initiate other processes.

Example 4: Flow Control Statements

```
quadrature counter PartPosition on inputs 0, 1  # declaration
wait for counter partPosition >= rejectDistance from position
        # condition (co-processor)
    if votes < 2 OR input DoReject is set  # flow control statement
        set output reject            # co-processor action
        failure_count++              # master processor action
        wait for counter time >= rejectDuration from now
            # condition (co-processor)
        clear output reject          # co-processor action
    else
        wait for counter partPosition >= acceptDistance from
        position
            # condition (co-processor)
        set output accept            # co-processor action
        wait for acceptDuration      # condition (co-processor)
        clear output accept          # co-processor action
    endif
```

Example 4 is a sub-process that includes a flow control statement. The sub-process of Example 4 includes four states, each of which is indicated by a "wait" statement and a particular condition of the real-world environment, e.g., is the part position counter greater than or equal to a predetermined value from a part's current position ("counter partPosition >=rejectDistance from position"). As in Examples 1-3, an action engine or co-processor evaluates each condition and, if the condition is met, notifies the master processor and performs an appropriate action, such as a no-op, clearing an output, or setting an output. The master processor advances the state machine and, optionally, acts in response to the notification.

In Example 4, the master processor controls the flow of the state machine by evaluating a flow statement ("if votes <2 OR input DoReject is set") relating to whether or not a part has passed inspection at two different inspection stations. In another part of the overall process (not listed above), the inspection stations "vote" on the part's quality, and the master processor increments a variable "votes" in response to the inspection stations' outputs. At the same time, the co-processor monitors the part's position. If the co-processor senses that the part has reached a particular position, it notifies the master processor, which evaluates the flow control statement in response to the notification. If the master processor determines that the part has failed inspection (e.g., because the "votes" variable is less than 2 or the "DoReject" input is set), the master processor increments a failure count ("failure_count") and causes or allows the co-processor to reject the part by setting the "reject" output. The state machine then advances to a state in which the co-processor waits for the counter time to equal or exceed a specified time period ("rejectDuration"). If the part has not failed inspection, the master processor advances the state machine to a state in which the co-processor waits for the part position counter to equal or exceed another variable ("acceptDistance").

Examples 3 and 4 also illustrate the use of declaration statements to set variables and to configure peripheral devices, e.g., cameras, etc. Declarations may be used to set variables stored in the master processor's memory, like the "sequence" variable in Example 3 or the (implicitly) declared "rejectDistance" and "position" variables in Example 4. They can also set counter values, like the "partPosition" counter in Example 4, which is declared to be a quadrature counter "partPosition" on inputs 0 and 1. It could also be declared to be a pulse counter "partPosition" on the rising edge of input 2.

Other declarations may set peripheral variables, including input and output variables. Inputs can be declared to have pulse filters. Outputs can be declared to have pulse widths and polarity inversions. The counter and other peripheral variable declarations get compiled into instructions executed by the master processor, which loads the configuration registers of the peripheral devices. When the counter is used in the program, the event table conditions and actions access the counter allocated by the compiler.

Example 5: Setup Process

```
one-shot process setup
begin
    for i := 0..7 do
        start process send_on_sequence[i]
    done
end
```

Example 5 is a set-up process that the master processor uses to task the action engine/co-processors with different instances of a particular process. Unlike the processes in Examples 1-4, the Example 5 process does not involve any conditions. Instead, it is a simple one-shot process that creates eight instances of another process (here, the "send_on_sequence" process from Example 3). Each of these instances runs on a corresponding slot in an action engine or on a separate co-processor.

In various embodiments, any language statement (computer-implementable instruction) can be executed on the housekeeping CPU 190, but greater or smaller sets of language statements can also be executed by one or more action engines described herein. Any statements that cannot be executed on the action engines of a particular embodiment of the invention may be run on the housekeeping CPU 190. In general any statements that can be run on the action engine of a particular embodiment will be allocated by the housekeeping CPU 190 to the action engines. Statements or groups of statements may be cancelled at any time prior to their execution.

In one embodiment, the computer-implementable instructions permit that any processes described in an appropriate computer language (e.g., SCORE™) can be run simultaneously and that multiple instances of a given process may also run concurrently. In one aspect, the language is compiled into condition/action pairs described in greater detail above; in exemplary implementations, such condition/action pairs are assembled into an event table which may be scanned at a high and fixed rate (e.g., as discussed above in connection with the event table 112 and action engine 110c of FIG. 6). The condition/action pairs may also be chained as described in greater detail below.

With reference to FIG. 6, in one embodiment the housekeeping CPU 190 may add and remove entries to the event table 112 of an action engine 110c without affecting or interrupting the operation of the action engine 110c. If necessary due to the housekeeping CPU word size (which may be, e.g., 32 bits) being less than the width of the event table register 140c (which may be, e.g., 64 bits) a given register 140c can be written in part by writing the input conditions to zero first, then writing the action second. Registers 140c that are currently not in use may have a zero first word which indicates a "not in use" conditional operation which can never be satisfied. The scanner 130c will not consider any event table conditions 142c in its scan that have a "not in use" condition, so instructions 144c in a partially written event table register 140c will not be executed before the housekeeping CPU 190 finishes writing the partially written event table register 140c.

In another aspect, any statement or chained group of registers 140c that the housekeeping CPU 190 may allocate to the action engine 110c will either run in their entirety, or not at all. In particular, by writing chained groups into contiguous event table registers 140c from the first to the last (with respect to the scan direction) with zeros, then the last to the first (again with respect to the scan direction) with the new conditions 142c and actions 144c, no condition/action pairs will be processed (e.g., by the scanner 130c of the action engine 110c) unless all are processed, even if the scanner 130c passes through the addresses of the corresponding section of memory multiple times while the housekeeping CPU 190 is writing the chained group; the scanner's rules are such that it will not execute the actions of an event table register 140c in a chained group, even if that event table register's own input conditions are met, unless all of the input conditions of all of the preceding event table registers 140c up to and including the next previous event table register 140c whose chain bit is not set are also met. Since each new event table register 140c is being written in a section of event table registers 140c set to zero, the prior event table register 140c will not have valid input conditions and so neither it nor the event table register 140c just written will be executed.

Similarly, by clearing a set of chained event table registers 140c from the first to the last (e.g., by filling the registers 140c with all zeros or all ones), and for each event table register 140c beginning by clearing the input conditions for each event table register 140c first, at a rate equal to or slower than the rate at which the scanner 130c is addressing the event table registers 140c, the housekeeping CPU 190 may replace or clear even a chain of event table registers 140c for a procedural step that had been allocated to a particular co-processor/action engine in such a way that either the entire set of chained registers 140c will be executed, or none will be executed.

The foregoing techniques for programming the master processor 190, efficiently compiling the program language to provide executable code (e.g., for the processing unit(s) 194 and the master processor 190), and the resulting procedure implemented by the master processor 190 for updating an event table 112 of an action engine 110c (or more generally "programming" one or more co-processors to evaluate particular conditions) yields several unique advantages. This methodology produces an extremely compact set of code that can run very rapidly on any general-purpose processor (with or without one or more action engines or other co-processors). However, when employed in connection with the action engine 110c shown in FIG. 6, and in particular with the scanner 130c, these techniques yield completely deterministic operation even when the evolution of conditions in the dynamic environment would require code execution to branch, and/or function calls to be made and/or cancelled for conventional systems. In fact these transitions can be made without rearranging memory pointers in the action engine 110c, since the inventive techniques described above allow multiple subroutines (e.g., chains of event table register 140c) to run to completion without signaling back to the calling process (in the master processor 190). The simplicity of the instruction set, which does not have any loops or jumps, keeps the run time of the co-processor/action engine program space deterministic.

Also note that the housekeeping CPU 190 does not need to be dedicated to housekeeping for the action engine(s). Housekeeping could be done by a process and/or device driver on a general-purpose operating system such as Linux or Windows. The action engine could be on a peripheral card (such as a PCI) along with the counters, digital and/or analog I/O interfaces, etc., allowing a general-purpose computer to achieve the same precision in event handling as a special-purpose embedded computer when working in tandem with the action engine(s) described herein. The action engine and/or seperate co-processors may also be implemented in one or more field-programmable gate arrays (FPGAs) or as a collection of other suitable processors.

Pipelining, Latency, and Jitter

In one exemplary implementation of the action engine 110c shown in FIG. 6, the scanner 130c is configured to implement a "pipelining" technique to make comparisons of the input signals 66 to the conditions 142c. As understood by those of skill in the art, "pipelining" is a computational technique that increases throughput by splitting a computation into a series of stages that are connected to form a computational "pipe." Each stage of the pipe performs its part of the computation (e.g., the comparison of the input signals 66 to the set of conditions 142c) in parallel with the other stages, much like a worker on an assembly line. Pipelining accelerates the action of the scanner 130c such that regardless of how long it may take to compare the input signals 66 to a given condition 142c, the time spent on each register 140c is limited to one clock cycle.

With respect to calculating a "latency" of the action engine, i.e., the time period required to compare a particular input state of the dynamic environment at a given time to the multiple sets of conditions contained in the event table and transmit one or more instructions in response to the input state, in some exemplary embodiments such a latency may be derived in consideration of a pipelining technique implemented by the action engine 110c. For example, the time it takes for the action engine 110c to compare the input signals 66 and/or discovered state changes (see paragraph 89 above) to a particular set of conditions 142c and transmit one or more instructions in response equals the time it takes the scanner 130c to reach the corresponding event table register 140c plus the propagation time through the pipeline, which depends on the number of stages in the pipeline. For an event table 112 with 128 registers 140c and a scanner 130c clocked at 100 MHz with a three-stage pipeline, the longest possible time from input to output is 1.31 µs, which corresponds to a condition 142c that occurs at the very beginning of a scan through the event table 112 but is not used until the very end of the scan through the event table 112 plus a 0.03 µs propagation time through the pipeline (i.e., three clock cycles). The shortest possible time from input to output is 0.030 µs. Thus, the action engine 110c compares the input signals 66 and/or discovered state changes to the sets of conditions 142c with a latency, or time delay, that is bounded by the number of registers 140c in the event table 112, the number of stages in the pipeline, and the clock frequency.

An additional advantage of using an event table register 140c to evaluate a small number of conditions 142c very quickly is that the variation in latency is very low. Jitter can be defined as the difference between the longest latency and shortest latency. For an event table register 140c that evaluates a single condition 142c, the variation in latency is minimal, and may even border on zero depending on how incoming and outgoing data is transmitted. In the example above, the longest possible latency is 1.31 µs, and the shortest possible latency is about 0.03 µs, which corresponds to a jitter of 1.28 µs, or one scan time. (Applying input filters, discovering input state changes, or receiving and transmitting data via Ethernet packets may introduce variable delay independent of the action engine 110c.)

Low jitter is especially useful in applications—e.g., triggering images—in which long response delays are perfectly acceptable so long as the latency is very repeatable, and in which even much shorter maximum latencies are not acceptable if the individual latencies were highly variable. In machine vision applications, for instance, reducing the jitter makes it possible to reduce the sensor field of view, which in turn allows for higher resolution images of the scene of interest. Consider a situation in which the time window for imaging a fast-moving part is about 10 µs, but the jitter is much larger than 100 µs as it would be with a PLC. Capturing an image of the part requires expanding the time window to substantially greater than 110 µs by increasing the field of view to be well over eleven times the size of the part itself, which in turn reduces the number of pixels on the sensor dedicated to imaging the part by a factor of more than eleven. In contrast, an action engine 110c with a jitter of about 2.5 µs can be used to acquire an image of the same part with about 80% of the sensor's active area dedicated to imaging the part itself.

Condition/Action Pair Memory Structures and Execution

Embodiments of the present invention may include particular memory structures to store the one or more "condition/action pairs." In the action engine 110c shown in FIG. 6, for example, the event table 112 provides dedicated memory in the form of multiple registers 140c, respective ones of which store a condition/action pair as a particular sequence of bits (represented generally in FIG. 6 by a condition 142c and an action or "instruction" 144c). Alternatively, one or more registers 140c may include multiple adjacent memory registers, arranged as a first number of bits representing the condition to be evaluated, and a second number of bits representing an action to be taken if the condition is satisfied. Generally speaking, various embodiments, such as those shown in FIGS. 5 and 6, may include memory structures in the form of one or more registers (e.g., registers 140b in FIG. 5; registers 140c in FIG. 6) that hold respective condition/action pairs as some arrangement of bits in a given register.

It should be appreciated that, in some instances, a given action corresponding to a particular condition that is satisfied may be to take no action relating to control of one or more devices in the dynamic environment. Stated differently, one possible action for a given condition/action pair is to take no affirmative action in the dynamic environment, also referred to herein as a "no-op." In some instances of a no-op, as discussed in greater detail below, the action engine may nonetheless notify the master processor if the particular condition being evaluated is satisfied, and/or move on to evaluation of one or more other conditions as specified in subsequent registers of the event table.

It should also be appreciated that the concept of a "condition/action pair" may be implemented in diverse manners according to various embodiments disclosed herein. For example, in some implementations, the contents of memory representing the condition portion of a particular condition/action pair may include some number of adjacent bits within a given register, and/or may include some number of bits dispersed in the given register with intervening register contents not necessarily pertaining to the condition portion. Similarly, the contents of memory representing the action portion of a particular condition/action pair may include some number of adjacent bits within a given register, and/or may include some number of bits dispersed in the given register with intervening register contents not necessarily pertaining to the action portion. Accordingly, a wide variety of content organization within a given memory location/register representing a given condition/action pair is contemplated according to the inventive concepts disclosed herein.

In one example discussed in detail below, a memory structure to contain a condition/action pair may include a 64-bit word-sized register (e.g., that may be accessed and read in a single clock cycle), some number of bits of which represent or relate to the condition 142c to be evaluated, and another number of bits of which represent or relate to the action 144c to be taken if the condition is satisfied. In one non-limiting example, the 64-bit register is segregated into three portions, and the condition 142c and action 144c are encoded in these three different portions respectively as: 1) an "op-code" represented by a 16-bit unsigned integer; 2) a 16-bit "action parameter"; and 3) a 32-bit "condition operand", wherein the information contained in the action parameter and the condition operand may facilitate implementation of an operation contained in the op-code. TABLE 1 below illustrates the general format of such a 64-bit register, in which the op-code portion is represented in bits 48-63, the action parameter is represented in bits 32-47, and the condition operand is represented in bits 0-31.

TABLE 1

| Illustrative Encoding of Condition/Action Pair | | |
| --- | --- | --- |
| 63-48 | 47-32 | 31-0 |
| Op-code | Action Parameter | Condition Operand |

With respect to the op-code portion of the 64-bit register illustrated in TABLE 1, TABLE 2 below provides an exemplary format for different fields of the 16-bit op-code:

TABLE 2

| Illustrative Encoding of Condition/Action Op-code | | | | | | | | | | | | | | | |
| --- | --- | --- | --- | --- | --- | --- | --- | --- | --- | --- | --- | --- | --- | --- | --- |
| F | E | D | C | B | A | 9 | 8 | 7 | 6 | 5 | 4 | 3 | 2 | 1 | 0 |
| OP | | | | ACT | | | | C | X | N | S | L | CTR | | |

In the example above, the four most significant bits of the op-code (bits 15-12, respectively labeled in TABLE 2 as "F", "E", "D", and "C") specify a condition type code (labeled as "OP") for the condition 142c to be evaluated. The four next most significant bits (bits 11-8, respectively labeled in TABLE 2 as "B", "A", "9", and "8") represent an action operand (labeled as "ACT") for the action 144c. The remaining bits of the op-code include a chain bit C, an XOR bit X, a notify bit N, a satisfied bit S, a last condition bit L, and one or more counter values CTR, each of which is described in turn in greater detail below.

In the present example, with reference again to TABLE 1, the 32-bit "condition operand" in bits 0-31 of the 64-bit register may be used together with the condition type code specified in the OP field of the op-code to determine whether or not a particular condition has been satisfied. Additionally, the 16-bit "action parameter" in bits 32-47 of the 64-bit register may be used together with the action operand specified in the ACT field of the op-code to specify a corresponding action to be taken if the particular condition is satisfied. Moreover, the op-code fields C (chain), X (XOR), and CTR (counter) may be employed for evaluation of a particular condition, and the op-code fields N (notify), S (satisfied) and L (last condition) may be employed to specify a corresponding action. Thus, as discussed in greater detail below, a first set of bits/fields of the 64-bit register shown in TABLE 1, namely OP, C, X, CTR and the "condition operand," may collectively define the condition 142c of the condition/action pair represented in the 64-bit register; similarly, a second set of bits/fields of the 64-bit register, namely ACT, N, S, L and the "action parameter," may collectively define the action 144c of the condition/action pair represented in the 64-bit register.

More specifically, the condition type code OP of the op-code shown in TABLE 2 specifies the type of condition to be monitored, one or more input signals to be monitored, and/or the state of any monitored input signal(s) that satisfies the condition. For some condition type codes OP, satisfaction of the condition depends at least in part upon one or more values of the 32-bit "condition operand" represented in bits 0-31 of the 64-bit register (refer to TABLE 1 above).

Exemplary condition type codes that may be present in the OP field of the op-code include, but are not limited to:

---

0—Register is Unused
1—Act when counter # CTR is less than or equal to the operand
2—Act when counter # CTR is greater than or equal to the operand
3—Act when rising edge detected on any inputs set in operand[0 . . . 15]
4—Act when falling edge detected on any inputs set in operand[0 . . . 15]
5—Act when trigger ladder fires on any ladder set in operand[0 . . . 3]
6—Act when high signal present on any inputs set in operand[0 . . . 15]

-continued

7—Act when low signal present on any inputs set in operand[0 . . . 15]
8—Act when high signal present on all inputs set in operand[0 . . . 15]
9—Act when low signal present on all inputs set in operand[0 . . . 15]
10—Act when set state exists on any flags set in operand[0 . . . 31]
11—Act when clear state exists on any flags set in operand[0 . . . 31]
12—Act when set state exists on all flags set in operand[0 . . . 31]
13—Act when clear state exists on all flags set in operand[0 . . . 31]
14—Act when counter # CTR direction (condition[bit 0]: 1 −> inc, 0 −> dec)
15—undefined

---

Additional condition type codes specified in the OP field of the op-code can be defined using the X bit, discussed below (e.g., condition type codes 3-15 above may be redefined using the X bit). In this non-limiting example, the CTR bits are used for condition type codes 1, 2 and 14; in other examples, the CTR bits may be used to redefine the other condition type codes when non-zero.

The action operand ACT of the op-code shown in TABLE 2 above specifies a corresponding action to be taken when the condition specified by the condition type code and the condition operand (and in some cases other fields of the 64-bit register) is satisfied. For some action operands ACT, the action to be taken depends at least in part upon one or more values of the 16-bit "action parameter" represented in bits 32-47 of the 64-bit register (refer to TABLE 1 above). Exemplary action operand codes that may be present in the ACT field of the op-code include, but are not limited to:

---

0—No-op—do nothing (e.g., raise interrupt completion if N is set)
1—Queue Message Transmit
The action-parameter is interpreted as containing the descriptor # in bits 0-3, a notify housekeeping CPU on message acknowledgement flag in bit 5, a notify housekeeping CPU on message failure flag in bit 6, a payload index in bits 12-6.
2—Set outputs: A bit set in the action parameter indicates the output is to set.
3—Clear outputs: A bit set in the action parameter indicates the output is to cleared.
4—Latch data inputs. (No action parameter)
5—Latch counter value: A bit set in the action parameter indicates the counter is to latched.
6—Zero counter: A bit set in the action parameter indicates the counter is to zeroed.
7—Set flags MSW: A bit set in the action parameter indicates the flag is to be set.
8—Set flags LSW: A bit set in the action parameter indicates the flag is to be set.
9—Clear flags MSW: A bit set in the action parameter indicates the flag is to be cleared.
10—Clear flags LSW: A bit set in the action parameter indicates the flag is to be cleared.
11—Get Semaphore: The semaphore index is given in the action parameter.
12—Release Semaphore: The semaphore index is given in the action parameter.
13-15—reserved.

Action 15 may be an extension action with some number of bits of the action parameter used to indicate the action with a reduced number of bits to indicate the action operand.

---

The 16-bit action parameter used in conjunction with some of the action operands specified above may include, but is not limited to: a descriptor # (e.g., bits 0-3), a notify ack (e.g., bit 4), a notify exh (e.g., bit 5), a payload # (e.g., bits 6-12) or a bit field (e.g., bits 13-15).

As described above, other bits of the 16-bit op-code contained in bits 48-63 of the 64-bit register representing a condition/action pair may include a chain bit C from the previous register. If the chain bit C is set, the condition 142c in the preceding event table register 140c must be true before the condition 142c in this event table register 140c can be considered. They may also include an XOR bit X that implements a shadow register so that comparisons do not have to deal with overflow or underflow; a notify bit N, which, when set to 1, causes upon satisfaction of the input conditions a completion message to be forwarded to the housekeeping CPU 190, and a satisfied bit S that is set when the condition 142c is satisfied.

The other bits may also include a last condition bit L that is used to cause the scanner to reset the condition operand OP to zero when the condition 142c is satisfied. In other words, the last condition bit L prevents the next scan from of the event table 112 re-satisfying the condition. When multiple conditions 142c are to be satisfied (e.g., using the chain bit C as described below) before an action 144c is to be performed, the preceding registers will not have the L bit set so that the operation can be re-evaluated. Event table registers that are chained together with a do-always condition may have the last bit set to prevent the action from recurring.

The action engine 110c can be programmed using the SCORE™ programming language. In particular, as discussed above, the housekeeping CPU (master processor) 190 may be programmed via an inventive programming language according to one embodiment of the present invention that, when compiled, enables the master processor to in turn provide instructions to task the action engine, in the form of condition/action pairs. Examples of SCORE™ statements and resulting event table settings are given below. The SCORE™ statements are formatted such that each line of SCORE™ code matches with a single condition/action pair:

Chain Bits for Monitoring More Complex Conditions

In some cases, the registers 140c of the event table 112 shown in FIG. 6 may not be wide enough to describe more complex condition/action pairs. In such cases, the action engine 110c, event table 112, and scanner 130c can be configured to evaluate more complicated sets of input conditions (e.g., multiple conditions upon satisfaction of which one or more actions are predicated) using chain bits (denoted "C" in FIG. 6). Each chain bit is logically part of the corresponding set of conditions 142c in that it includes the satisfaction of a particular condition 142c represented in the previous event table register 140c. In effect, chain bits can be used to increase the effective (and finite) size of a single event table register 140c by linking a group of contiguous event table registers 140c to form a single "super register" for the purposes of defining groups of input conditions, all of which must be satisfied for the actions described in this chained group of event table entries to be taken. Chaining together contiguous blocks of event table registers 140c logically "ANDS" the chained registers 140c together, i.e., it causes them to react to a particular combination of input signals 66 by issuing a particular set of instructions (possibly in a predetermined order).

FIG. 8 illustrates how chained event table registers 140c identify and react to a group of conditions 142c that have been chained together. (For simplicity, FIG. 8 shows only the sets of conditions 142c and outputs 144c for each register 140c.) Each event table register 140c reacts to a different combination of sensor inputs A-C and current counter values CTR (not shown in FIG. 8) as well as flag register values and

```
   wait for counter [3] >= 0x1000 from 0x10000
   and for set flag 4 send descriptor[1] with payload[2]
   set output 0
   ----
OP  ACT  C  X  N  S  L  CTR   AP      OPERAND
2   0    0  1  0  0  0  3     0x0000  0x00101000   # xor ctr value
10  1    1  0  0  0  1  0     0x00B1  0x00000010   # notify ack/exh = 1
2   2    1  0  1  0  1  0     0x0001  0x00000000   # ctr[0] >= 0 (always true)
====
   wait for rising edge of input 0
   and for clear inputs 1 and 2 latch counter[2]
   set outputs 3 and 4
   ----
OP  ACT  C  X  N  S  L  CTR   AP      OPERAND
3   0    0  0  0  0  0  0     0x0000  0x00000001   # note we never set the S bit
9   5    1  0  0  0  1  0     0x0004  0x00000006
2   2    1  0  1  0  1  0     0x0018  0x00000000
====
   wait for rising edge of input 0
   and for clear inputs 1 and 2 set output 3
   ----
OP  ACT  C  X  N  S  L  CTR   AP      OPERAND
3   0    0  0  0  0  0  0     0x0000  0x00000001
9   2    1  0  1  0  1  0     0x0008  0x00000006
====
   wait for rising edge of input 0 set output 3
   ----
OP  ACT  C  X  N  S  L  CTR   AP      OPERAND
3   2    0  0  1  0  1  0     0x0008  0x00000001
====
   wait for counter[3] >= 0x1100 from 0x10203040
   and for set input 1 or 2 send descriptor[2]
   set output 4
   ----
OP  ACT  C  X  N  S  L  CTR   AP      OPERAND
2   0    0  0  0  0  0  3     0x0000  0x10204140   # no xor
6   1    1  0  0  0  1  0     0x1FF2  0x00000010   # AP[12:6] = no payload
2   2    1  0  1  0  1  0     0x0010  0x00000000   # op = ctr[0] >= 0
```
OP, C, X, CTR and OPERAND define the condition.
ACT, N, S, L and AP define the action.

whether a semaphore request earlier in the set of chained event table registers was successful. By convention, the first event table entry in a chained group 140c-1 will not have its chain bit set. In this example, event table registers 140c-2 through 140c-4 all have chain bits C set to 1. Event table register 140c-5 has a low chain bit C and therefore operates independently of event table registers 140c-1 through 140c-4.

Chained registers 140c-1 and 140c-2 each include a respective condition 142c-1 and 142c-2 and a do-nothing (no-op) action 144c-1 and 144c-2, followed by a "critical register"—here, a single register 140c-3 with both a "useful" condition 142c-3 and an action 144c-3 other than a no-op. Such a "critical register" may be, and in this case is, followed by another register 140c-4 with an additional action which should also be taken when the chained group's input conditions are met. To ensure that the useful action 144c-4 is also immediately taken when that of the critical entry is executed, the input condition 142c-4 is set to a condition that is tautologically true i.e. counter[0]>=0 (no XOR). This will not cause premature execution of the action in this event table entry since as part of a chained group of event table entries, all of the preceding input conditions in this chained group must also be satisfied. The last condition bit L is set in register 140c-2, which means that registers 140c-1 and 140c-2 must be satisfied in a single table scan before the satisfied bit S is set on the critical register 140c-3. Once the satisfied bit S is set on the critical register 140c-3, the state of the preceding registers 140c-1 and 140c-2 does not matter as the action 144c-4 in the critical register 140c-4 will be retried on every scan (assuming it was a semaphore or send action, as all other actions complete on the first attempt). The register 140c-4 in the chain after the critical register 144c-3 will have the last condition bit L set, indicating the satisfied bit S can be set by the scanner 130c.

Semaphores for Tracking Evolutions of a Dynamic Environment

The action engine 110c shown in FIG. 6 can also issue a series of instructions in response to an evolution of the real-world system. For evolutions that occur more slowly than the maximum CPU response time (e.g. 10 to 1000 µs), the scanner 130c may report matches (satisfied conditions) to the housekeeping CPU 190, which responds by issuing instructions and/or updating one or more of the event table registers 140c as described above. For faster evolutions (i.e., those that may occur more quickly than the maximum CPU response time), the action engine 110c may use one or more semaphores to make conditions 142c contingent upon each other and/or to prevent contention (collision) among different registers 140c whose respective conditions 142c are at least partially satisfied by the same input signal(s) 66 without intervention by the housekeeping CPU 190. Generally speaking, semaphores facilitate management of resource contention, and may be acquired and released by the action engine to ensure availability one or more resources on which evaluation of one or more conditions rely.

In some instances, an event table register 140c-1 in a chained group of event table registers 140c may attempt to acquire one of a collection of semaphores which are managed by the scanner but which will typically be released by the scanner in response to semaphore release action in a later event table entry or may be released unilaterally by the housekeeping CPU 190. Together with their other input conditions, successful acquisition of the semaphore will automatically be a necessary condition for the execution of any subsequent response actions present in such a chained collection of event table registers.

In illustrative embodiments, semaphore handling is based on a test-and-set operation. A semaphore can be considered to be an R/S flip-flop. A set operation involves reading the output Q of the flop simultaneously with clocking the S input of the R/S flip-flop. If the semaphore was previously unset (result of the simultaneous read of the output of the R/S flip-flop was a logic low), then the set action is considered to be completed. If the semaphore was previously set, then the set action is not considered to be successful and actions dependent on a successful semaphore set will not be taken. Unlike other actions, the semaphore get action causes any subsequent registers 140c in this chain to be ignored until the semaphore get is successful (on a future scan). A release of the semaphore is accomplished by clocking the R input to the flop. Arbitrated versions of these semaphores may be used to coordinate the operation of multiple event table scanners 130c (e.g., as described with respect to FIG. 9). For example, an action engine with multiple scanners 130c may use a simple round robin arbitration scheme.

To see how the event table 112 uses semaphores, consider three concurrent processes that are involved in setting a clocked output (clock on output 0, data on outputs 1-7): (a) a first process responsible for waiting for a triggering event, acquiring a semaphore, setting the clock output low, setting the output value on 1-7, and enabling the second & third processes; (b) a second process that includes waiting for the setup time, setting the clock output high, and enabling the third process; and (c) a third process that includes waiting for the combined setup and hold times, releasing the semaphore, and notifying the housekeeping CPU 190. Each of the three processes is represented by a group of chained registers 140c in the event table 112. (The semaphore may be used by any process wanting to manipulate outputs 0-7, counter[1] and flag[0], allowing multiple sets of these processes on the event table 112 to send a clocked output without interfering with one another.) Assume further that the counter counter[1] has been set up to count microsecond ticks and is used for timing the output signals. In this example, the setup and hold time are both 1 ms on the output signals.

To begin, the first process acquires a semaphore. Once it has acquired the semaphore, it clears outputs 0 and 2-7, sets output 1, resets a counter (counter[1]) configured to count timebase pulses, in this case a 1 MHz timebase, and sets a flag (flag[0]) using a series of five registers that are chained together. The first process may be expressed using the following SCORE™ statements (with comments) and condition/action pairs (coded as above and in hexadecimal format):

```
wait for rising edge of input 9 get semaphore[0]
    clear outputs 0, 2, 3, 4, 5, 6, 7          # these chained action are
    set output 1                                # deferred until the scan in which
    reset counter[1]                            # semaphore 0 acquisition succeeds
    set flag[0]
    ---
```

-continued

```
OP  ACT  C  X  N  S  L  CTR  AP       OPERAND
3   11   0  0  0  0  1   0   0x0000   0x00000200   # on rising edge, get semaphore
2   3    1  0  0  0  1   0   0x00FD   0x00000000   # then, clear outputs 0, 2-7
2   2    1  0  0  0  1   0   0x0002   0x00000000   # then, set output 1
2   6    1  0  0  0  1   0   0x0002   0x00000000   # then, reset counter[1]
2   8    1  0  1  0  1   0   0x0001   0x00000000   # then, set flag[0]
---
0x3B08_0000    0x0000_0200    # restatement of the condition/action pairs
0x2388_00FD    0x0000_0000    # given above in hexadecimal format
0x2288_0002    0x0000_0000
0x2688_0002    0x0000_0000
0x28A8_0001    0x0000_0000
```

The second process begins once the flag is set. It then sets an output at a given counter value. The corresponding SCORE™ statements (with comments) and condition/action pairs (coded as above and in hexadecimal format) for the second process are:

```
wait for flag[0]
    and for counter [1] >= 1000 set output 0
---
OP  ACT  C  X  N  S  L  CTR  AP       OPERAND
12  0    0  0  0  0  0   0   0x0000   0x00000001   # wait on flag[0]
2   2    1  0  1  0  1   1   0x0001   0x000003e8   # ctr[1] >= 1000, set output
---
0xC000_0000    0x0000_0001
0x22A9_0001    0x0000_03e8
```

The third process begins once the flag is set. Once the given counter reaches a second value, it clears the first flag and releases the semaphore. The corresponding SCORE™ statements (with comments) and condition/action pairs (coded as above and in hexadecimal format) for the third process are:

```
wait for flag[2]
    and for counter[1] >= 2000 clear flag[0] and flag[1]
    release semaphore[0]
---
OP  ACT  C  X  N  S  L  CTR  AP       OPERAND
12  0    0  0  0  0  0   0   0x0000   0x00000002   # wait on flag[1]
2   10   1  0  0  0  1   1   0x0001   0x000007D0   # ctr[1] >= 2000, clear flag[0]
2   12   1  0  1  0  1   0   0x0000   0x00000000   # ctr[0] >= 0, rel semaphore[0]
---
0xC000_0000    0x0000_0002
0x2A89_0001    0x0000_07D0
0x2CA8_0000    0x0000_0000
```

Note that only one flag is used to enable the second and third processes, (b) and (c), because the third process, (c), is waiting on the counter elapsing the combined setup and hold times. The semaphore protects the use of the counter and the flag so that all groups of processes can use the same counter and flag.

Alternatively, these three separate, concurrently running processes may written as a single SCORE™ statement because the timing requirements of the setup-and-hold times are 1 ms, which is more than enough time for the housekeeping CPU 190 to act:

```
wait for rising edge of input 9 get semaphore[0]
    clear outputs 0, 2, 3, 4, 5, 6, 7
    set output 1
    reset counter[1]
```

-continued

```
wait for counter[1] >= 1000 set output 0
wait for counter[1] >= 2000 release semaphore[0]
```

The housekeeping CPU 190 may replace the first four-register chain with a single-register chain on completion. On the completion of that second chain, another single chain entry would be written to execute the third wait and the semaphore release.

Action Engines with Multiple Event Table/Scanner Co-Processors

Figure 9:
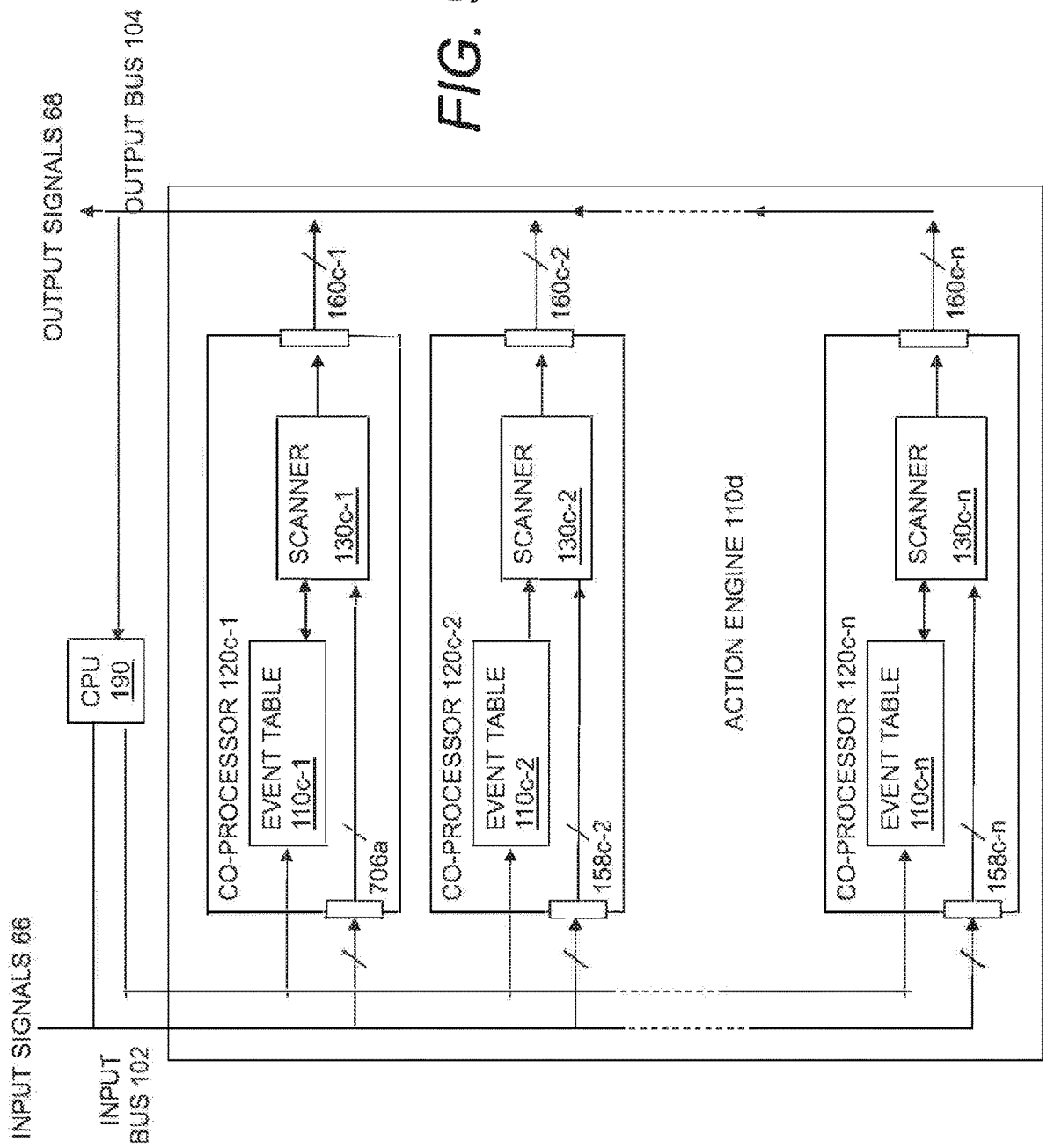
FIG. 9 is a block diagram of an action engine that includes multiple co-processors, each of which includes an event table and a scanner, that are configured to respond to operate in parallel to control at least one aspect of a dynamic environment, according to one embodiment of the present invention.

FIG. 9 shows an action engine 110c that includes multiple parallel co-processors (respectively, co-processors 120c-1 through 120c-n; collectively, co-processors 120c) coupled to an input bus 102 via a respective input port (respectively input ports 158c-1 through 158c-n; collectively input ports 158c). Each co-processor 120c includes a respective event table (respectively event tables 110c-1 through 110c-n; collectively event tables 110c) coupled to a respective scanner (respectively scanners 130c-1 through 130c-n; collectively scanners 130c). As above, each event table 112 includes multiple entries, each of which represents one or more sets of independent conditions and corresponding actions.

The co-processors 120*c* operate in parallel to execute the condition/action pairs stored in the event tables 110*c* with very low latency, e.g., latencies of about 1.6 µs or less. During parallel execution, each scanner 130*c* compares the conditions in the event table 112 to input signals 66 received via the input bus 102 and input port 158*c* and executes instructions in the event of a match as described with respect to FIGS. 6-8. If appropriate, the scanner 130*c* transmits output signals 68 via a respective output port (respectively output ports 160*c*-1 through 160*c*-*n*; collectively output ports 160*c*) to the output bus 102. The action engine 110*c* may also include counters, flag registers, and/or semaphore registers as described above with respect to FIG. 6.

Examples of the action engines described above can be implemented as a single event table scanner on a single FPGA (e.g., using HDL code) with a memory large enough to hold 144*c* opcodes, or "condition/action" pairs. The scanner executes the event table by evaluating the conditions sequentially. When the scanner finds a satisfied chain of conditions, it executes the actions and notifies a master CPU, which may implemented on the same FPGA, as to which register(s) in the event table is being used for the satisfied condition. The master CPU reloads the register(s) in question with new op-codes as the process follows the evolution of the real-world condition. Alternatively, action engines may be implemented as: a dedicated chip containing event table memories and scanners embedded in a peripheral component interface (PCI) card and used in a general-purpose computer; an embedded processor to decode an event table and run native instructions instead of placing native op-codes in the co-processor memory; and multiple FPGAs, each of which has a separate FPGA program to evaluate the conditions at a very low latency.

Dynamic Environments Employing Machine Vision Techniques/Equipment

As noted earlier, control systems according to various embodiments of the present invention, as well as constituent elements thereof, may have wide applicability for monitoring and/or controlling a variety of dynamic environments, particularly those requiring low latency (i.e., significantly fast response time) and/or low variability latency. One exemplary application of control systems according to the present invention is given by a dynamic environment in which machine vision techniques and/or equipment are employed.

Figure 10:
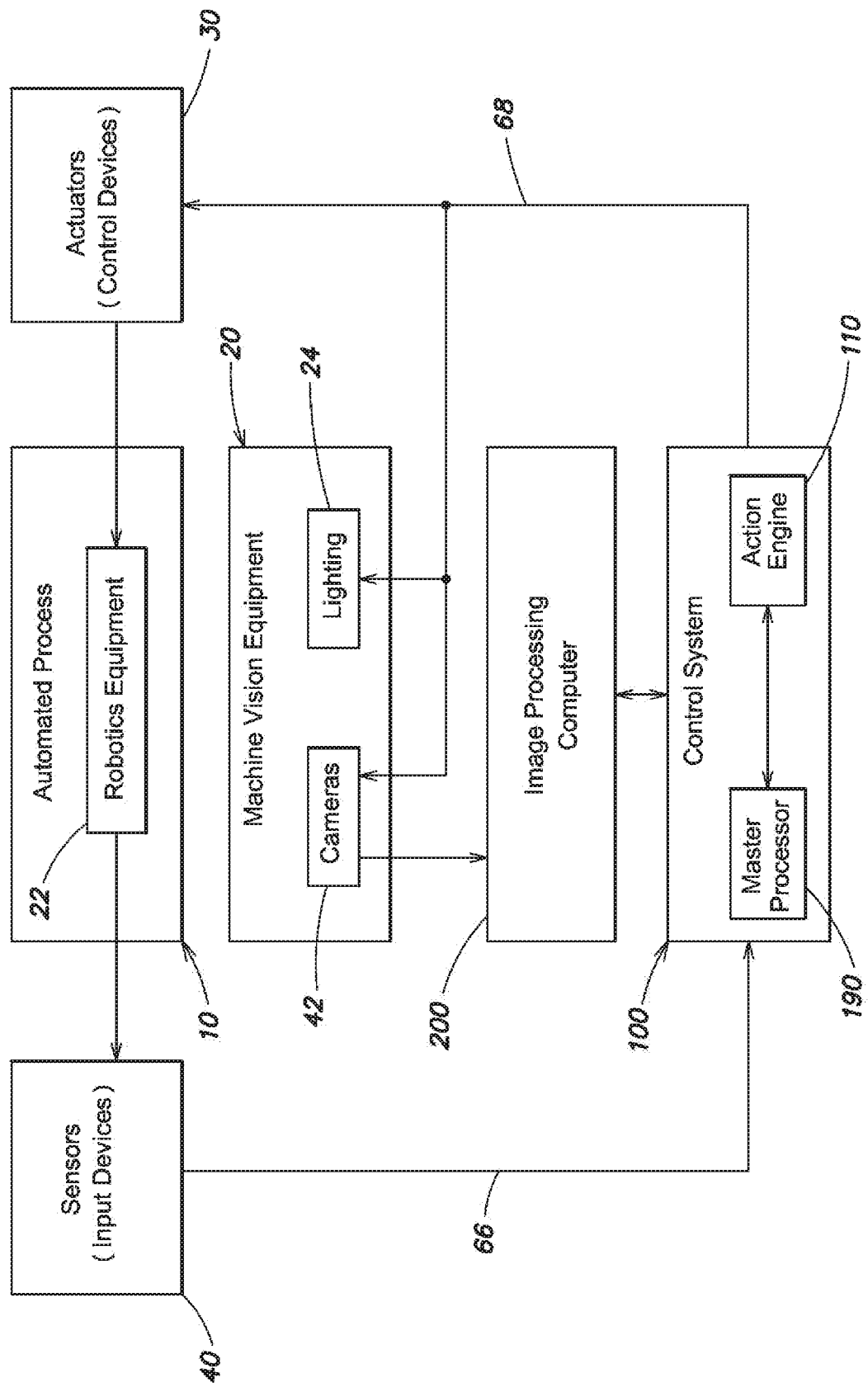
FIG. 10 is a block diagram of a dynamic environment in which machine vision techniques and equipment are employed, as well as a control system according to one embodiment of the present invention, for monitoring and controlling the dynamic environment.

FIG. 10 is a block diagram of a dynamic environment in which machine vision techniques and equipment are used, together with a control system according to embodiments of the present invention for monitoring and controlling the dynamic environment. The dynamic environment illustrated in FIG. 10 generally relates to an automated process 10, in which various robotics equipment 22 as well as machine vision equipment (collectively equipment 20) may be employed to facilitate implementation of the automated process 10, wherein the machine vision equipment may include one or more image acquisition devices 42 and lighting equipment 24.

Examples of an automated process 10 for which the control concepts discussed herein are applicable include, but are not limited to, counting, tracking, sorting and/or handling of parts on an assembly line (e.g., for automotive, consumer goods manufacturing and/or agricultural applications), quality control functions (e.g., automated inspection for defects) in connection with a manufacturing process, measurement of position and/or orientation of parts for manipulation by robotics equipment, and removing undesirable artifacts from bulk materials (e.g., food stuffs, agricultural products, etc.).

In FIG. 10, the dynamic environment also includes various actuators or control devices 30 (in a manner similar to that shown in FIG. 1) to control the robotics equipment 22, the lighting equipment 24 and/or the image acquisition device(s) 42. The environment also includes various sensors or input devices 40 to monitor the automated process 10 and provide information (e.g., one or more input signals 66) representing a monitored condition of the environment at a given time. As shown in FIG. 10, the sensors may include the one or more image acquisition devices 42 to acquire images relating to the automated process, as well as one or more other sensors (e.g., temperature, humidity, pressure, light and/or other environmental sensors; counters; receive queues for information packets, some of which information packets may be provided by one or more image acquisition devices or other devices, etc.), for providing input signals representing monitored conditions.

FIG. 10 also shows a control system 100, including a master processor 190 and an action engine 110 as described above in connection with various embodiments, to receive and process one or more input signals 66 representing monitored conditions as a function of time so as to provide one or more output signals 68 to the control devices 30 (which in turn control one or more of the robotics equipment, the lighting equipment, and the image acquisition devices). Additionally, the dynamic environment shown in FIG. 10 also may include an image processing computer 200, communicatively coupled to the control system 100, to process image information acquired by the one or more image acquisition devices and to control the lighting equipment. In embodiments including the image processing computer 200, at least some of the information otherwise provided by the one or more input signals 66 representing monitored conditions of the dynamic environment may be provided by the image processing computer 200 to the control system 100, particularly in connection with information derived from images acquired by the one or more image acquisition devices.

In the dynamic environment shown in FIG. 10, the image acquisition device(s) 42 and the lighting equipment 24 may be particularly employed to implement machine vision techniques in connection with monitoring and control of the automated process 10. The term "machine vision" very generally refers to analysis of images to extract data for purposes of controlling a process. Machine vision techniques typically comprise a sequence of operations involving acquisition of images using any of a variety of image acquisition devices (e.g., digital still or video cameras), and in some cases lenses and various lighting equipment (which in some instances may be particularly designed and configured to provide various differentiation of certain objects from the general environment to facilitate subsequent image processing). Image data provided by one or more image acquisition devices can be in a variety of formats (e.g., video sequences, views from multiple cameras, or multi-dimensional data, as from a medical scanner). Acquired images are then processed (e.g., via execution of various image processing software by an imaging processing computer 200 operably coupled to the machine vision equipment 20 and the control system 100, and/or one or more other independent/external computing devices) so as to extract various information from the images, which extracted information then is used to make decisions in connection with controlling the automated process.

With respect to various lighting equipment and techniques that may be employed for machine vision, two-dimensional visible light imaging techniques (using monochromatic or color light sources) perhaps are most commonly adopted. However, other suitable imaging techniques include, but are not limited to, selective infrared imaging in which infrared lighting equipment (e.g., sources and/or filters) may be employed, line scan imaging, three-dimensional imaging of surfaces, and X-ray imaging. Regarding the image acquisition devices, a number of form factors, functionalities, and communication protocols may be employed in such devices; for example, in some instances an image acquisition device may not have any particular image processing capability, while in other instances image acquisition devices may be implemented with some degree of image processing functionality (e.g., "smart" cameras or sensors). Also, various commercially available image acquisition devices may be configured to communicate data via any of a variety of interfaces, such as Ethernet, USB or FireWire connections.

Regarding exemplary image processing techniques that may be implemented by the master processor 190 of the control system 100, the image processing computer 200, and/or one or more other computing/processing devices, examples of typical techniques include, but are not limited to, thresholding (converting a grayscale image to black and white, or using separation based on a grayscale value), segmentation, blob extraction, pattern recognition, barcode and data matrix code reading, optical character recognition, gauging (measuring object dimensions), positioning, edge detection, color analysis, filtering (e.g. morphological filtering) and template matching (finding, matching, and/or counting specific patterns).

In FIG. 10, various image information extracted from acquired images as a result of using any one or more of the image processing techniques noted above may be included as part of the overall information represented by one or more input signals 66 received by the control system 100 from one or more sensors/input devices, and/or provided to the control system 100 by the image processing computer 200. For example, such extracted image information may indicate that a particular object (e.g., a part on an assembly line) was present in one or more images acquired at a particular time, that a particular position and/or orientation of an object was detected in one or more images, that a particular defect was observed in an object present in one or more images, and the like. Such information extracted from images may be used alone or in combination with other information from one or more sensors to represent a monitored condition of the automated process at a given time, upon which the control system may be configured to prescribe one or more particular corresponding actions to be taken in connection with the automated process 10.

CONCLUSION

While various inventive embodiments have been described and illustrated herein, those of ordinary skill in the art will readily envision a variety of other means and/or structures for performing the functions and/or obtaining the results and/or one or more of the advantages described herein, and each of such variations and/or modifications, is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A control system for monitoring and controlling a dynamic environment having a plurality of conditions in response to which a plurality of actions are required, the control system comprising:
  a master processor; and
  at least one co-processor communicatively coupled to the master processor and including a co-processor memory, wherein in operation the master processor loads contents into the co-processor memory to configure the at least one co-processor to:
    evaluate only a first subset of the plurality of conditions by receiving at least one input signal representing at least one monitored condition of the plurality of conditions and processing the at least one input signal so as to determine if at least one condition of the first subset is satisfied; and provide first control information representing at least one action of the plurality of actions if the at least one condition of the first subset is satisfied, wherein:
the at least one condition of the first subset of the plurality of conditions evaluated by the at least one co-processor includes a first condition comprising detection of a first object;

the at least one input signal received and processed by the at least one co-processor includes a part detect signal representing the detection of the first object the at least one co-processor processes the part detect signal to determine if the first condition is satisfied by the detection of the first object and if the at least one co-processor determines that the first condition is satisfied, the at least one co-processor includes a first identifier for the first object in the first control information representing the at least one action.

2. The control system of claim 1, wherein the at least one co-processor transmits a notification signal to the master processor if the at least one co-processor determines that the first condition is satisfied by the detection of the first object.

3. The control system of claim 2, wherein:
the master processor loads other contents into the co-processor memory, based at least in part on the notification signal received from the at least one co-processor, to re-task the at least one co-processor to:
evaluate at least one new condition not included in the first subset of the plurality of conditions; and
provide second control information representing at least one second action of the plurality of actions if the at least one new condition is satisfied.

4. The control system of claim 1, wherein:
the first control information representing the at least one action includes a first data packet; and
the first identifier for the first object is included as metadata in the first data packet.

5. The control system of claim 1, wherein:
the first object is a first part on an assembly or inspection line; and
the first identifier for the first object is a part number or an instance number of the first part on the assembly or inspection line.

6. The control system of claim 1, wherein:
the at least one condition of the first subset of the plurality of conditions evaluated by the at least one co-processor includes the first condition comprising detection of the first object and a second condition comprising determining a particular position of the first object; and
the at least one co-processor includes in the first control information the first identifier for the first object if the at least one co-processor determines that the first object is detected and has reached the particular position.

7. The control system of claim 6, wherein the at least one co-processor transmits at least one notification signal to the master processor if the at least one co-processor determines that the first object is detected and has reached the particular position.

8. The control system of claim 7, wherein:
the master processor loads other contents into the co-processor memory, based at least in part on the at least one notification signal received from the at least one co-processor, to re-task the at least one co-processor to:
evaluate at least one new condition not included in the first subset of the plurality of conditions; and
provide second control information representing at least one second action of the plurality of actions if the at least one new condition is satisfied.

9. The control system of claim 6, wherein:
the master processor loads into the co-processor memory first contents representing a first wait statement specifying the first condition comprising detection of the first object;

the master processor loads into the co-processor memory second contents representing a second wait statement specifying the second condition comprising determining the particular position of the first object; and the at least one co-processor evaluates the first contents representing the first wait statement and the second contents representing the second wait statement to determine if the first object is detected and has reached the particular position.

10. The control system of claim 1, wherein:
the at least one action includes taking at least one still image and/or at least one video of the first object; and the first control information representing the at least one action includes the first identifier for the first object and instructions for at least one camera to take the at least one still image and/or the at least one video of the first object.

11. The control system of claim 10, wherein:
the first control information includes a first data packet; and
the first identifier for the first object is included as metadata in the first data packet.

12. The control system of claim 11, wherein:
the first object is a first part on an assembly or inspection line; and
the first identifier for the first object is a part number or an instance number of the first part on the assembly or inspection line.

13. The control system of claim 12, wherein:
the at least one condition of the first subset of the plurality of conditions evaluated by the at least one co-processor includes:
a first condition comprising detection of the first part; and
a second condition comprising determining a particular position on the assembly or inspection line of the detected first part;

the at least one input signal received and processed by the at least one co-processor includes:
a first input signal comprising the part detect signal; and
a second input signal comprising respective counter values output by a counter and representing respective positions of the detected first part; and the at least one co-processor:
processes the first input signal to determine if the first condition is satisfied by detection of the first part;
processes the second input signal to determine if the second condition is satisfied by determining that the detected first part has reached the particular position on the assembly or inspection line; and
includes in the first data packet the part number or instance number for the first part and the instructions for the at least one camera to take the at least one still image and/or the at least one video of the first part, if the at least one co-processor determines that the first part is detected and has reached the particular position on the assembly or inspection line.

14. The control system of claim 13, wherein:
the master processor loads into the co-processor memory first contents representing a first wait statement specifying the first condition comprising detection of the first part;
the master processor loads into the co-processor memory second contents representing a second wait statement specifying the second condition comprising determining the particular position on the assembly or inspection line of the detected first part; and
the at least one co-processor evaluates the first contents representing the first wait statement and the second contents representing the second wait statement to determine if the first object is detected and has reached the particular position.

15. The control system of claim 14, wherein:
the at least one action comprises:
a plurality of first actions corresponding to the first condition, the plurality of first actions comprising:
latching the counter at a first counter value representing a detected position of the first part on the assembly or inspection line; and
setting the part number or the instance number of the first part;
a plurality of second actions corresponding to the second condition, the plurality of second actions comprising:
generating the first data packet including the part number or the instance number of the first part and the instructions for the at least one camera to take the at least one still image and/or the at least one video of the first part; and
causing the first data packet to be transmitted to the at least one camera;
the first contents represents the first wait statement specifying the first condition and the plurality of first actions;
the second contents represents the second wait statement specifying the second condition and the plurality of second actions;
the at least one co-processor evaluates the first wait statement and, if the first condition is satisfied, performs the plurality of first actions, based on the first contents; and
the at least one co-processor evaluates the second wait statement and, if the second condition is satisfied, performs the plurality of second actions, based on the second contents.

16. The control system of claim 10, wherein the at least one still image and/or the at least one video of the first object, once taken by the at least one camera, is processed by an image processing computer to extract image information from the processed at least one still image and/or at least one video of the first object, and wherein:
the master processor receives, from the image processing computer, the extracted image information from the at least one still image and/or the at least one video of the first object; and
the master processor loads other contents into the co-processor memory, based at least in part on the extracted image information received from the image processing computer, to re-task the at least one co-processor to:
evaluate at least one new condition not included in the first subset of the plurality of conditions; and
provide second control information representing at least one second action of the plurality of actions if the at least one new condition is satisfied.

17. The control system of claim 16, wherein the extracted image information received by the master processor from the image processing computer includes the first identifier for the first object.

18. The control system of claim 17, wherein the extracted image information received by the master processor from the image processing computer indicates at least one of:
a particular position and/or a particular orientation of the first object; or
a particular defect in the first object.

19. The control system of claim 16, further comprising the image processing computer, wherein the image processing computer implements at least one image processing technique including at least one of:
thresholding;
segmentation;
blob extraction;
pattern recognition;
barcode and data matrix code reading;
optical character recognition;
gauging;
positioning;
edge detection;
color analysis;
morphological filtering; or
template matching.

20. The control system of claim 16, further comprising the at least one camera, wherein the at least one camera includes the image processing computer.

21. A control system for a factory assembly or inspection line, the factory assembly or inspection line comprising:
a plurality of pieces of industrial equipment at designated points in the factory assembly or inspection line through which a plurality of parts pass, in first-in-first-out (FIFO) order, for assembly, packaging, and/or inspection of the plurality of parts;
a first sensor proximate to a first designated point in the factory assembly or inspection line to detect a first part of the plurality of parts and output a first part detect signal upon detection of the first part;
a first part position counter to output counter values representing respective positions along the factory assembly or inspection line of the first part of the plurality of parts relative to the first designated point;
a first camera proximate to a second designated point in the factory assembly line to acquire a first image of the first part, the second designated point having a first known counter value output by the first part position counter relative to the first designated point; and
a second camera proximate to a third designated point in the factory assembly line to acquire a second image of the first part, the third designated point having a second known counter value output by the first part position counter relative to the first designated point;
the control system comprising:
a master processor; and
at least one co-processor communicatively coupled to the master processor and including a co-processor memory,
wherein in operation the master processor loads contents into the co-processor memory to configure the at least one co-processor to:
A) wait for the first part detect signal;
B) in response to the first part detect signal:

B1) latch the first part position counter to a first counter value corresponding to the first designated point; and B2) set a first tracking instance value corresponding to the first part;

C) wait for the first part position counter to output a second counter value equal to the first known counter value corresponding to the second designated point in the factory assembly or inspection line to which the first camera is proximate;

D) in response to the first part position counter outputting the second counter value, send a first trigger packet to the first camera, the first trigger packet including a first payload, wherein the first payload includes the first tracking instance value corresponding to the first part;

E) wait for the first part position counter to output a third counter value equal to the second known counter value corresponding to the third designated point in the factory assembly or inspection line to which the second camera is proximate; and F) in response to the first part position counter outputting the third counter value, send a second trigger packet to the second camera, the second trigger packet including a second payload, wherein the second payload includes the first tracking instance value corresponding to the first part.

22. A control system for monitoring and controlling a dynamic environment having at least a first condition in response to which at least one first action is required and a second condition in response to which at least one second action is required, the control system comprising:

a master processor; and at least one co-processor communicatively coupled to the master processor and including a co-processor memory, wherein:

the master processor offloads into the co-processor memory first contents representing the first condition and the at least one first action, and second contents representing the second condition and the at least one second action;

the at least one co-processor receives:

at least one first input signal representing at least one first monitored condition in the dynamic environment; and at least one second input signal representing at least one second monitored condition in the dynamic environment;

the at least one co-processor processes the at least one first input signal and the at least one second input signal, based on the first contents and the second contents offloaded by the master processor into the co-processor memory, to asynchronously evaluate if the first condition has occurred in the dynamic environment and/or if the second condition has occurred in the dynamic environment;

the at least one co-processor generates a first output to cause the at least one first action if the first condition has occurred in the dynamic environment; and the at least one co-processor generates a second output to cause the at least one second action if the second condition has occurred in the dynamic environment.

23. The control system of claim 22, wherein:

the at least one co-processor transmits a first notification signal to the master processor if the at least one co-processor determines that the first condition has occurred in the dynamic environment; and the at least one co-processor transmits a second notification signal to the master processor if the at least one co-processor determines that the second condition has occurred in the dynamic environment.

24. The control system of claim 23, wherein:

the master processor offloads the first contents into the co-processor memory, based at least in part on the second notification signal received from the at least one co-processor;

the master processor offloads the second contents into the co-processor memory, based at least in part on the first notification signal received from the at least one co-processor; or the master processor offloads third contents into the co-processor memory, based at least in part on at least one of the first notification signal and the second notification signal received from the at least one co-processor, to re-task the at least one co-processor to evaluate a third condition of the dynamic environment in response to which a third action is required.

25. The control system of claim 22, wherein:

the dynamic environment is a factory assembly and/or inspection line through which a plurality of parts pass for assembly, packaging, and/or inspection of the plurality of parts;

the first condition comprises detection of a first part of the plurality of parts;

the at least one first input signal comprises a part detect signal output by a first sensor at a first position on the factory assembly and/or inspection line;

the second condition comprises determining a second position on the factory assembly and/or inspection line of the first part;

the at least one second input signal comprises respective counter values output by a counter and representing respective positions of the first part; and the at least one co-processor:

processes the at least one first input signal to determine if the first condition is satisfied by detection of the first part; and processes the at least one second input signal to determine if the second condition is satisfied by determining that the first part has reached the second position on the factory assembly and/or inspection line.

26. The control system of claim 25, wherein:

the at least one first action comprises:

latching the counter at a first counter value representing the first position of the first part on the factory assembly and/or inspection line; and setting a part number or an instance number of the first part; and the least one second action comprises:

generating a first data packet including the part number or the instance number of the first part and instructions for a first camera proximate to the second position to take at least one first still image and/or at least one first video of the first part; and causing the first data packet to be transmitted to the first camera.

27. The control system of claim 26, wherein:

the dynamic environment of the factory assembly and/or inspection line has a third condition in response to which at least one third action is required;

the master processor offloads into the co-processor memory third contents representing the third condition and the at least one third action;

the at least one co-processor receives at least one third input signal representing at least one third monitored condition in the dynamic environment;

the at least one co-processor processes the at least one first input signal, the at least one second input signal, and the at least one third input signal, based on the first contents, the second contents, and the third contents offloaded by the master processor into the co-processor memory, to asynchronously evaluate if at least one of the first condition, the second condition, or the third condition has occurred in the dynamic environment;

the at least one co-processor generates the first output to cause the at least one first action if the first condition has occurred in the dynamic environment;

the at least one co-processor generates the second output to cause the at least one second action if the second condition has occurred in the dynamic environment; and the at least one co-processor generates a third output to cause the at least one third action if the third condition has occurred in the dynamic environment.

28. The control system of claim 27, wherein:

the third condition comprises determining a third position on the factory assembly and/or inspection line of the first part;

the at least one third input signal comprises the respective counter values output by the counter and representing the respective positions of the first part;

the at least one co-processor processes the at least one third input signal to determine if the third condition is satisfied by determining that the first part has reached the third position on the factory assembly and/or inspection line; and the least one third action comprises:

generating a second data packet including the part number or the instance number of the first part and instructions for a second camera proximate to the third position to take at least one second still image and/or at least one second video of the first part; and causing the second data packet to be transmitted to the second camera.

29. The control system of claim 28, wherein the at least one second still image and/or the at least one second video of the first part, once taken by the second camera, is processed by an image processing computer to extract image information from the processed at least one second still image and/or at least one second video of the first part, and wherein:

the master processor receives, from the image processing computer, the extracted image information from the at least one second still image and/or the at least one second video of the first part; and the master processor offloads fourth contents into the co-processor memory, based at least in part on the extracted image information received from the image processing computer, to re-task the at least one co-processor to evaluate a fourth condition of the dynamic environment of the factory assembly and/or inspection line in response to which a fourth action is required.

30. The control system of claim 29, wherein the extracted image information received by the master processor from the image processing computer includes the part number or the instance number of the first part and indicates at least one of:

a particular position and/or a particular orientation of the first part; or a particular defect in the first part.

* * * * *